(12) United States Patent
Sugimoto et al.

(10) Patent No.: US 7,770,368 B2
(45) Date of Patent: Aug. 10, 2010

(54) ENVELOPING DEVICE

(75) Inventors: Kenichi Sugimoto, Ibaraki (JP);
Toshiyuki Ohnishi, Ibaraki (JP);
Takashi Kakimoto, Ibaraki (JP);
Satoshi Hanaoka, Ibaraki (JP);
Yoshinori Masaoka, Ibaraki (JP)

(73) Assignee: Gunze Limited, Kyoto (JP)

( * ) Notice: Subject to any disclaimer, the term of this patent is extended or adjusted under 35 U.S.C. 154(b) by 151 days.

(21) Appl. No.: 12/087,325

(22) PCT Filed: Dec. 15, 2006

(86) PCT No.: PCT/JP2006/325066

§ 371 (c)(1),
(2), (4) Date: Aug. 18, 2008

(87) PCT Pub. No.: WO2007/077720

PCT Pub. Date: Jul. 12, 2007

(65) Prior Publication Data

US 2009/0007526 A1      Jan. 8, 2009

(30) Foreign Application Priority Data

Dec. 28, 2005  (JP)  ............................ 2005-376875

(51) Int. Cl.
*B65B 43/04*   (2006.01)
*B65B 51/14*   (2006.01)
*B43M 3/00*    (2006.01)

(52) U.S. Cl. .................. 53/569; 53/562; 53/284.3; 53/374.6

(58) Field of Classification Search .............. 53/569, 53/284.3, 284.7, 374.3, 374.5, 374.6, 381.5–381.7, 53/562; B65B 11/48, 43/04, 51/14
See application file for complete search history.

(56) References Cited

U.S. PATENT DOCUMENTS

| | | | | |
|---|---|---|---|---|
| 3,858,381 | A | * | 1/1975 | Huber et al. ................. 53/569 |
| 4,205,504 | A | * | 6/1980 | Gregoire et al. ............ 53/284.3 |
| 4,268,346 | A | * | 5/1981 | Achelpohl ................... 156/510 |
| 4,817,368 | A | * | 4/1989 | DePasquale et al. ....... 53/284.3 |
| 5,375,390 | A | * | 12/1994 | Frigo et al. .................. 53/562 |
| 5,430,990 | A | * | 7/1995 | Long ............................ 53/284.3 |
| 5,457,941 | A | * | 10/1995 | Long et al. .................. 53/284.3 |

FOREIGN PATENT DOCUMENTS

JP     42-0180897     9/1967

(Continued)

*Primary Examiner*—Stephen F Gerrity
(74) *Attorney, Agent, or Firm*—Karl F. Milde, Jr.; Ecker Seamans Cherin & Mellott, LLC

(57) ABSTRACT

An enveloping device (1), capable of repeatedly performing a process for producing an envelope and inserting a content into the envelope at high speed, comprises: a film feeder (2) for feeding a film (7) wound on a roll and supplied in the form of two overlapping folds that extend in a width direction (W); an envelope making device (3) for repeatedly forming an envelope by cutting and fusing, in a longitudinal direction of the film (7), the two overlapping folds while conveying the film; an envelope conveying conveyor (5) which conveys a plurality of envelopes (8) while arranging these envelopes in a line; and an inserting device (6) for inserting a content (9) into each envelope (8) conveyed by the envelope conveyor (5).

6 Claims, 19 Drawing Sheets

FOREIGN PATENT DOCUMENTS

| | | |
|---|---|---|
| JP | 05-1320011 | 5/1993 |
| JP | 6-238779 | 8/1994 |
| JP | 9-504744 | 5/1997 |
| JP | 10-119150 | 5/1998 |
| JP | 3205428 B2 | 6/2001 |
| JP | 2001-301062 | 10/2001 |
| JP | 2002-045775 | 2/2002 |
| JP | 2005-162328 A | 6/2005 |

* cited by examiner

ENVELOPING DEVICE

BACKGROUND OF THE INVENTION

The present invention relates to an enveloping device for inserting a content, such as a slip of paper or a booklet or the like into an envelope.

The technologies for inserting a content into a ready-made envelope are disclosed in JP 2005-162328-A, JP 05-132011-A, JP 06-298207-A, and JP 2002-321809-A. There are, however, various types of contents. For instance, if the content is rectangular paper or the like, the dimension ratio of the size of length and width is not always defined in specifications, and the number of pages (thickness) of the content to be inserted into one envelope is not fixed. Accordingly, it would be difficult to prepare an optimum envelope in view of the type of the content, so that it is advisable to conduct a process of inserting a content into the envelope in a unified fashion.

Further, in the prior art, each envelope needs to be sequentially made by intermittent movement of an envelope making device. Similarly, a content needs to be sequentially inserted into each envelope. Therefore, the process is further delayed when producing a large number of envelopes and further delay is unavoidable when inserting each content into the large number of envelopes.

SUMMARY OF THE INVENTION

It is an object of the present invention to provide an enveloping device capable of successively performing a process for inserting a content into an envelope at high speed while sequentially producing envelopes.

In a first preferred embodiment, an enveloping device according to the present invention comprises: film feeding means for feeding a film with dimensions in a width direction defined in a shape overlapping in two folds in the middle of the width direction; an envelope making device for forming an envelope by fusing the film folded in two by the heat of the heat cutter while pressing a heat cutter extending in the width direction of the film to the film in the middle of a longitudinal direction and dividing the film in the middle of the longitudinal direction; envelope conveying means for conveying the envelope; and an inserting device for inserting a content into the envelope, wherein the envelope making device presses the heat cutter to the film while moving the heat cutter forward the feeding direction in which the film is fed by the film feeding means, wherein the inserting device inserts the content into the envelope while moving the content forward the conveying direction in which the envelope is conveyed by the envelope conveying means.

In a second preferred embodiment, the envelope making device comprises: cutter actuation means for pressing the heat cutter to the film or moving the heat cutter away from the film; a back-up roller opposed to the heat cutter for supporting a part in the film where the heat cutter is pressed to; and side follower means for moving the heat cutter and the back-up roller forward the feeding direction in the process of pressing the heat cutter to the film and moving the heat cutter and the back-up roller backward the feeding direction in the process of moving the heat cutter away from the film.

In a third preferred embodiment, the cutter actuation means comprises: guiding means for guiding the heat cutter; a cam rotated by a driving source; and a follower rod for reciprocating in accordance with the cam, wherein the follower rod is connected to the heat cutter.

In a fourth preferred embodiment, the envelope conveying means comprises: a belt conveyor wherein a plurality of air vents spaced apart each other in the conveying direction are formed on a belt running along the conveying direction and wherein a plurality of air grooves extending in the conveying direction and arranged longitudinally one another in the conveying direction are formed in a position corresponding to just below the plurality of air vents of a support body for supporting the belt; and a plurality of suction means respectively connected to the plurality of air grooves, wherein each of the suction means generates suction for sucking the envelope via the air grooves in each of the air vents of the belt.

Alternatively, in a fifth preferred embodiment, the envelope conveying means comprises: a belt conveyor wherein a plurality of air vents spaced apart each other in the conveying direction are formed on a plurality of belts running along the conveying direction and wherein a plurality of air grooves extending parallel to each other with the conveying direction are formed in the position corresponding to just below the plurality of air vents of the support body for supporting the plurality of belts; suction means for generating suction for sucking the envelope via an air duct for connecting the plurality of air grooves to the plurality of air vents each other; and opening/closing means for connecting air grooves selected from the plurality of air grooves to the air duct or blocking the air grooves from the air duct.

In a sixth preferred embodiment, the inserting device comprises: a pair of guide rails spaced apart each other in the conveying direction for guiding the content into the envelope; a push rod arranged between the pair of guide rails for pushing the content into the envelope; and follower means for moving the pair of guide rails and the push rod in the conveying direction at a conveying speed that the envelope conveying means conveys the envelope.

In a seventh preferred embodiment, the follower means comprises: a plurality of follower wheels spaced apart each other in the conveying direction; an endless chain wound around the plurality of follower wheels and driven at the conveying speed in accordance with the turning of the plurality of follower wheels; a push follower connected to the push rod; and an endless push cam rail mounted along the endless chain for slidably engaging the follower rod, wherein the push follower and the push rod are displaced in the direction of approaching the envelope in accordance with the push cam rail in a process that the pair of guide rails and the push rod are supported by the endless chain and then the endless chain is driven, alternatively, the push follower and the push rod are displaced in the direction of moving away from the envelope.

In an eighth preferred embodiment, the follower means comprises: a guide follower connected to the pair of guide rails; and an endless guide cam rail mounted along the endless chain for slidably engaging the guide follower, wherein the guide follower and the pair of guide rails are displaced in the direction of approaching the envelope in accordance with the guide cam rail in the process that the endless chain is driven, alternatively, the guide follower and the guide rails are displaced in the direction of moving away from the envelope.

In a ninth preferred embodiment, according to the enveloping device of the present invention, the envelope making device moves the heat cutter forward the feeding direction, so that the heat cutter can be pressed to the film in the middle of the longitudinal direction without stopping the feeding of the film by the film feeding means. Thus, at the same time when the film folded in two is fused by the heat of the heat cutter, the film is divided in the middle of the longitudinal direction, resulting in forming of an envelope having margins where the film is divided.

Further, there is no need for the envelope conveying means to stop the conveying of the envelope because the content can be inserted into the envelope while moving the content forward the conveying direction in which the envelope is conveyed by the envelope conveying means. Therefore, according to the enveloping device, it is possible to perform a process for continuously inserting the content into each envelope while sequentially producing envelopes. In addition to that, it will be possible to make an envelope and to insert the content into the envelope at high speed, if the speed at which the film feeding means feeds the film and the speed at which the envelope conveying means conveys the envelope are set high.

Operation for moving the heat cutter forward the feeding direction can be realized by moving the heat cutter and the back-up roller forward the feeding direction using side following means in the process of pressing the heat cutter standing by in a prescribed position to the film by the cutter actuation means. Subsequently, the side following means moves the heat cutter and the back-up roller backward the feeding direction in a process of moving the heat cutter away from the film with the cutter actuation means, which leads the heat cutter and the back-up roller to return to the prescribed position.

Therefore, according to the enveloping device, it is possible to easily adjust the width of the envelope, in other words, the size between both sides of the envelope by simply changing the timing from the point when the cutter actuation means moves the heat cutter away from the film to the point when the heat cutter is pressed again to the film. Further, it is possible to prevent the film from bending in the form of a wave or to prevent the film from having defects, such as wrinkles when the heat cutter is pressed to the film, even if the film is fed at high speed from the film feeding means because the back-up roller opposed to the heat cutter supports the film.

Furthermore, when the cam mechanism configured by connecting a follower rod for reciprocating in accordance with a cam rotated by a driving source to the heat cutter guided by guiding means is applied, there is no possibility of the heat cutter springing toward the back-up roller when the heat cutter is pressed to the film. For example, in the configuration of moving both sides of the heat cutter up and down using two air cylinders, although it is difficult to perfectly synchronize the motion of the two air cylinders, mechanical transmission of the motion of the follower rod following one cam to the heat cutter enables the heat cutter to move down while keeping in a horizontal posture having averaged height between one of the sides and the other of the sides, so that all area in the width direction of the film can be uniformly divided by the heat cutter. That results in improvement of quality grade of the divided cut surface.

When a plurality of air grooves extending in the conveying direction and arranged longitudinally one another in the conveying direction are formed in a support body for supporting a belt of the envelope conveying means, suction means respectively connected to the plurality of air grooves generates suction in the air vents of the belt, so that the above-mentioned suction can be set for each suction means. This makes it possible to adjust strength of adsorbing one envelope to the belt in the process that one envelope is conveyed by a belt conveyor.

For example, a section where the inserting device pushes the content into the envelope and sections before and after the section are set during the process of conveying an envelope with a belt conveyor to allocate the positions of a plurality of air grooves for each section. In the section that the inserting device pushes the content into the envelope, suction of the suction means connected to the air grooves allocated to this section is so weakened that the envelope can slide against the belt. In this case, even if the envelope is conveyed by the belt conveyor in a posture which the envelope inclines its side against the direction in which the inserting device actuates a push rod, there is no possibility that the content pushed into the envelope is strongly rubbed, which leads to prevent defects, such as breakage of the envelope or the like. Further, it is preferable to allow the envelope to be strongly adsorbed to the belt in the sections before and after the section that the inserting device pushes the content into the envelope, so that it is preferable to strengthen each suction of the suction means connected to the air grooves allocated to these sections.

Alternatively, when a plurality of air grooves extending parallel to each other in the conveying direction are formed in the support body for supporting a plurality of belts of the envelope conveying means to allow these air grooves to be connected to each other via an air duct, it is possible for opening/closing means to block the air grooves that can be selected out of the plurality of air grooves from the air duct.

For example, in a travel that the belt conveyor conveys an envelope in a posture of inclining the sides toward the direction in which the inserting device actuates the push rod, the posture of the envelope can be corrected, following the content, the content is in contact with the inside of the inclined envelope when the content is pushed into the envelope. Since the envelope tends to rotate around near its mouth in such a correction process, blocking the air grooves positioned most far away from the mouth of the envelope from the air duct makes it possible to block the suction of the air vents in the belts positioned most far away from the mouth of the envelope. This helps the envelope rotate. To the contrary, connecting the air grooves to the air duct enables suction to revive immediately.

It is preferable to arrange content feeding means for preparing the content around a pair of guide rails without manpower when the inserting device applied to the enveloping device according to the present invention comprises: a pair of guide rails; a push rod; and follower means. The push rod can push the content into the envelope along the pair of guide rails every time the content fed from the content feeding means is put on the pair of guide rails in a horizontal posture. In this process, it is possible to relatively make the envelope and the pair of guide rails for dealing with the guiding of the content motionless because a speed at which the pair of guide rails are moved in the conveying direction by the follower means is set to be equal to the conveying speed at which the envelope conveying means conveys the envelope. This makes it possible to carry out a motion smoothly to insert a guide from the pair of guide rails into the envelope.

According to the enveloping device of the present invention, since the push follower and the push rod are displaced in the direction of approaching the envelope conveyed by the envelope conveying means or in the direction of moving away from the envelope in accordance with the push cam rail, operation of the push rod can be realized without connection between a drive source or an operating cylinder and the push rod. Therefore, there is no need to supply electricity, compressed air or an oil pressure or the like for a driving source or an operating cylinder moving in the conveying direction along with the push rod, resulting in a simplified structure of the enveloping device.

Furthermore, according to the enveloping device of the present invention, in accordance with the guide cam rails, the guide follower and the pair of guide rails are displaced in the direction of approaching the envelope conveyed by the envelope conveying means or in the direction of moving away from the envelope. Accordingly, operation of such pair of guide rails can be realized without any connection between the driving source or the operating cylinder and the pair of guide rails. Thus, there is no need to supply electricity, compressed air or an oil pressure or the like for the driving source or the operating cylinder moving toward the conveying direction along with the pair of guide rails, resulting in a simplified structure of the enveloping device.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
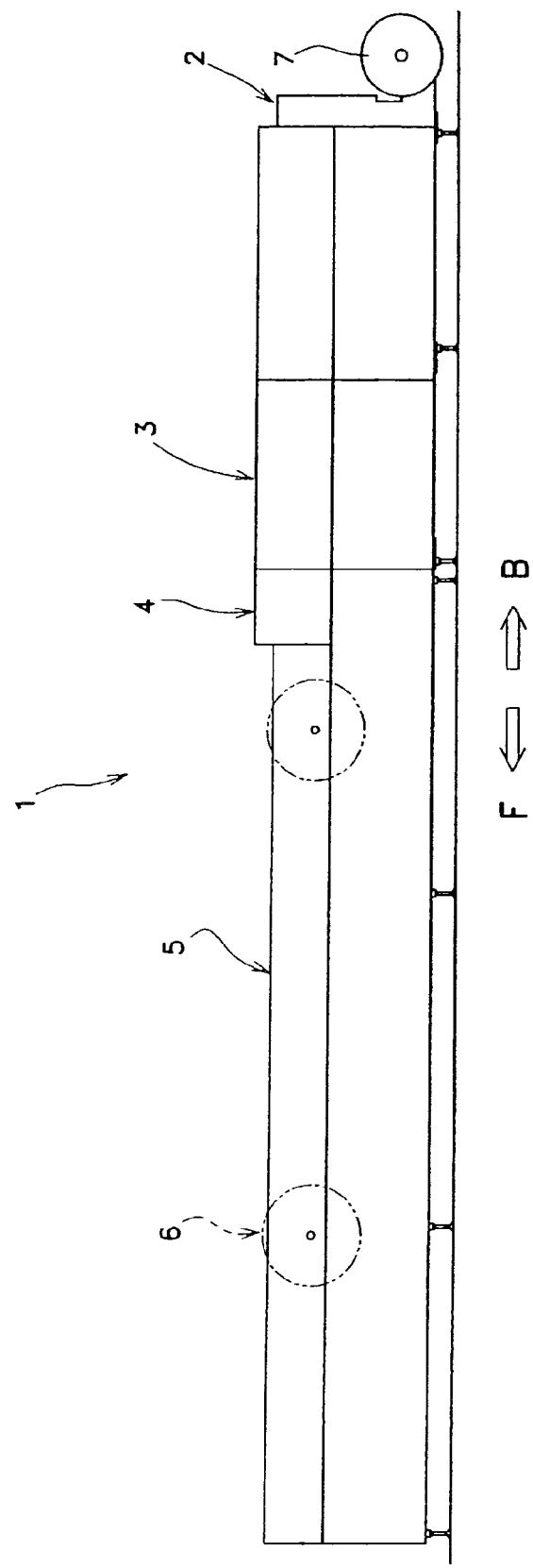
FIG. 1 is a side view of an enveloping device according to Example 1 of the present invention.

The preferred embodiments of the present invention will now be described with reference to FIGS. 1 to 19 of the drawings. Identical elements in various figures are designated with the same reference numerals.

Figure 2:
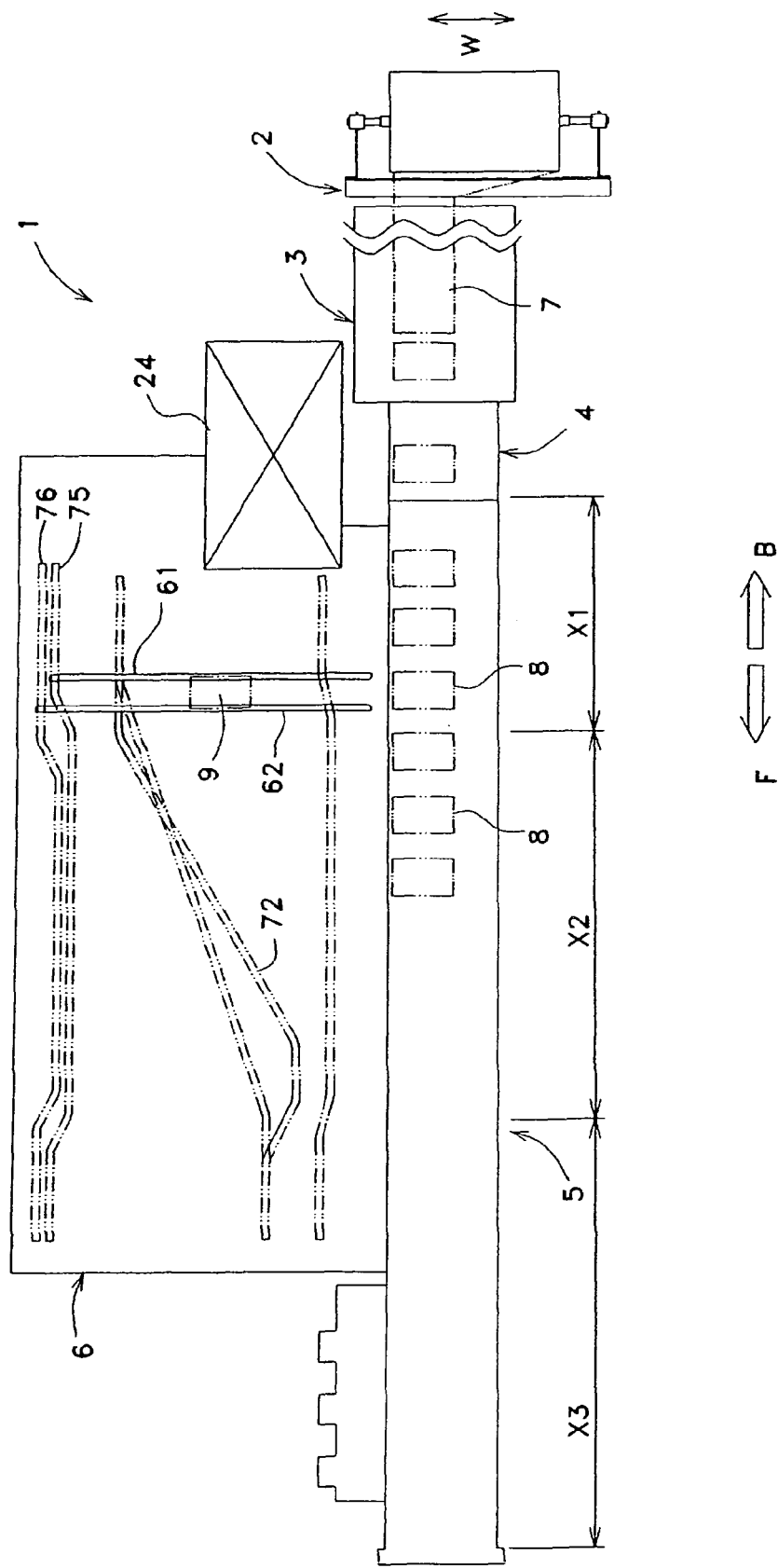
FIG. 2 is a plan view of the enveloping device according to Example 1 of the present invention.

As shown in FIGS. 1 and 2, an enveloping device 1 is configured by integrally coupling film feeding means 2, an envelope making device 3, a fast-forward conveyor 4, envelope conveying means 5, and an inserting device 6.

Figure 3:
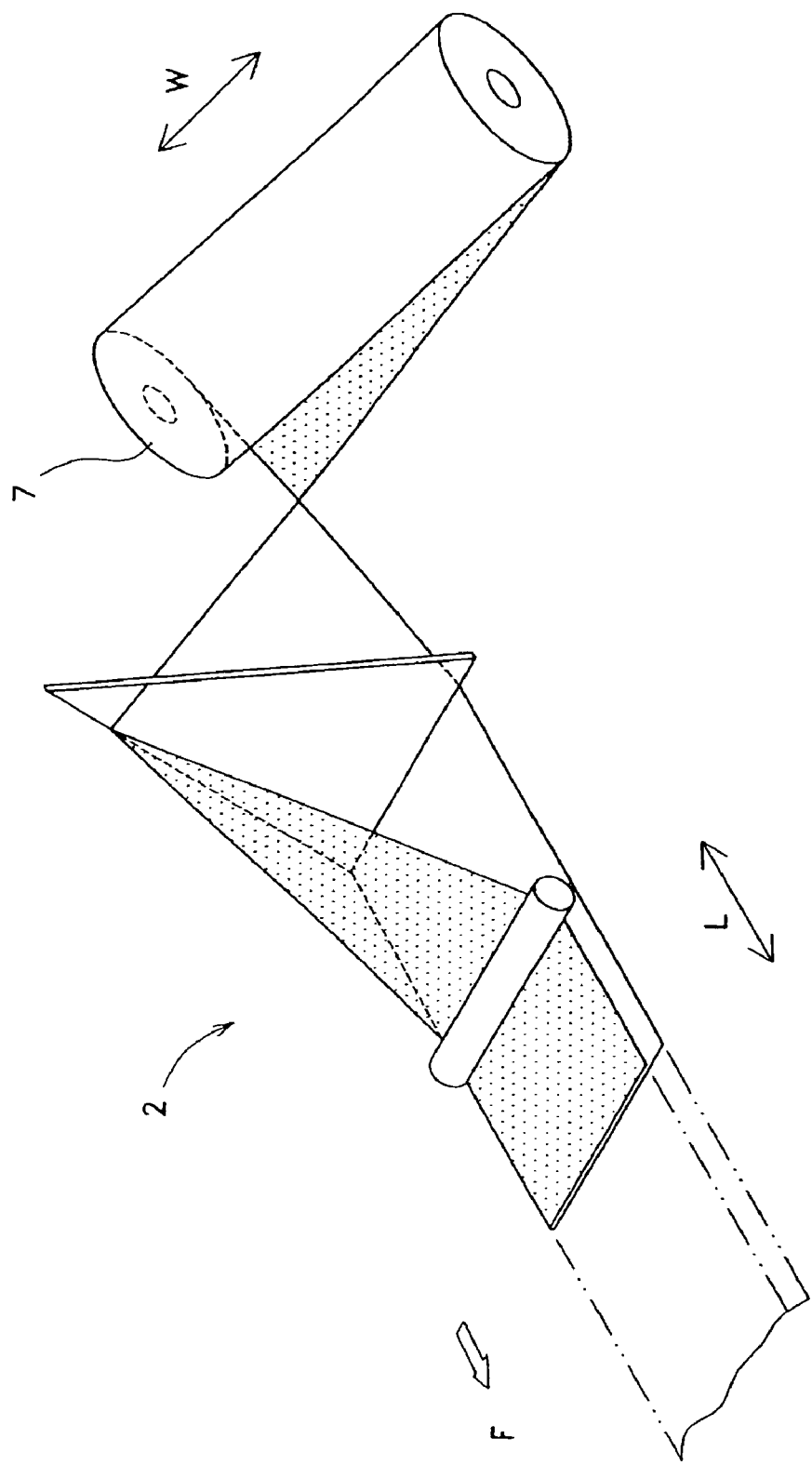
FIG. 3 is a perspective view illustrating principles of film feeding means applied to the enveloping device according to Example 1 of the present invention.

The film feeding means 2 sends a film 7 with dimensions in a width direction defined and wound in a roll shape overlapping in two folds in the middle of the width direction in accordance with principles shown in FIG. 3. Only if this feature can be materialized, the film feeding means 2 is not particularly needed to be limited. As shown in FIG. 2, the envelope making device 3 successively forms envelopes 8 by heating the film 7 overlapping in two folds in the middle of the longitudinal direction indicated by an arrow L orthogonal in the width direction. The envelope conveying means 5 is a conveyor for conveying a plurality of envelopes 8 while arranging the envelopes in a line. The inserting device 6 inserts each content 9 into the respective envelopes 8 in a process that the envelope conveying means conveys the envelopes 8.

The present invention will now be described in detail with reference to the following embodiments. Although it is not essential to conform a feeding direction in which the film 7 is fed from the film feeding means 2 to a conveying direction in which the envelopes 8 are conveyed by the envelope conveying means 5, these directions are unified as a "conveying direction" in the embodiments below.

Example 1

Since respective well-known art is applicable to a driving source, an operating cylinder, guiding means or feeding means, figures and description of the figures are omitted. For example, a servo motor or a rotating machine with reducer or an electric cylinder for extending and contracting an actuating rod in accordance with operation of the rotating-machine, an air cylinder or a hydraulic cylinder or the like are applied as driving sources. A sliding pair configured by slidably engaging a slider with a slide rail are applied as guiding means. A turning pair configured by screwing a feed screw together with a ball nut are applied as feeding means. The aforementioned slider is moved to a desired position by connecting a first of the turning pair to the slider and rotating a second of the turning pair by the rotating machine.

Figure 4:
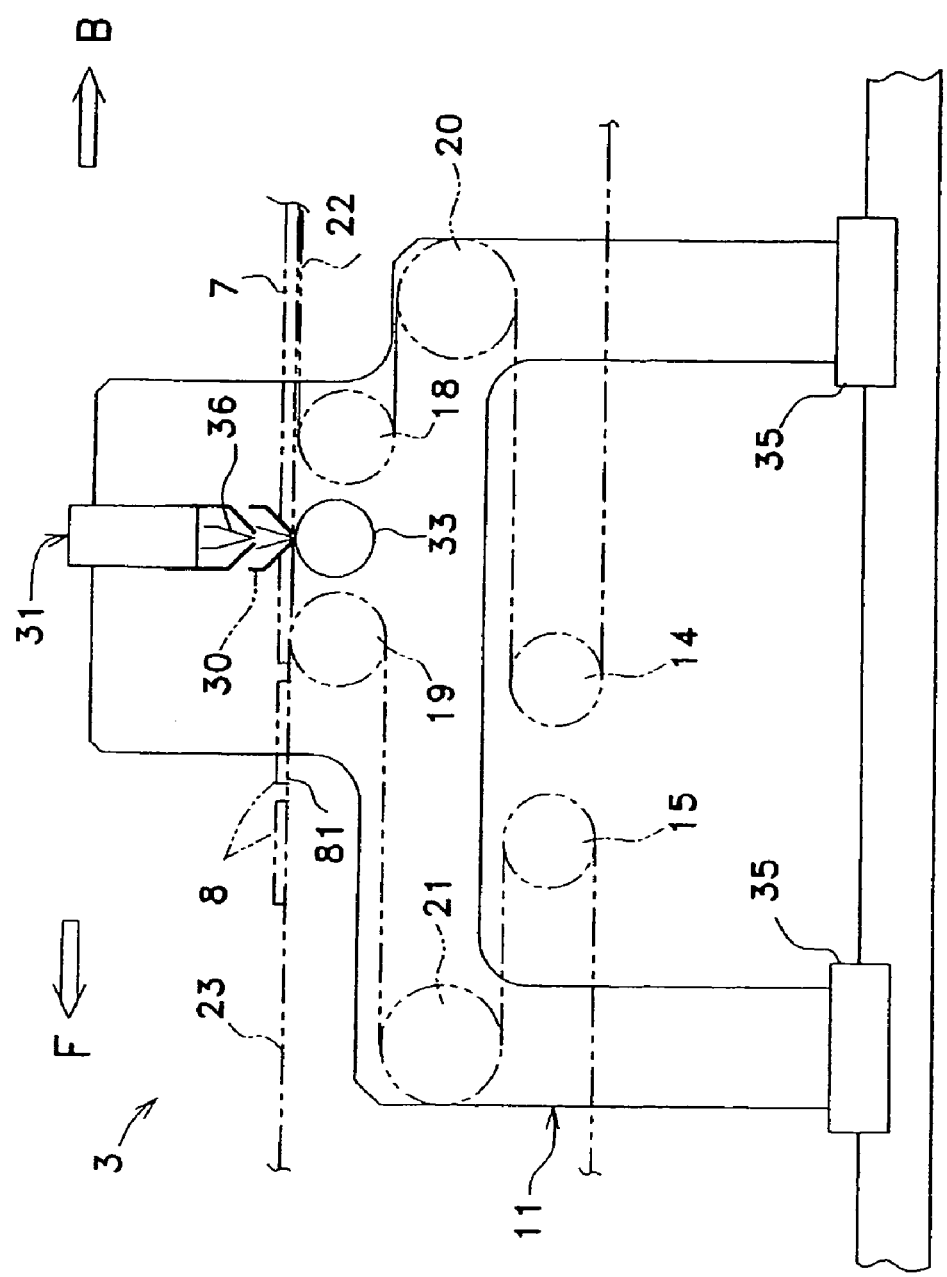
FIG. 4 is a side view of an important part of an envelope making device applied to the enveloping device according to Example 1 of the present invention.
Figure 5:
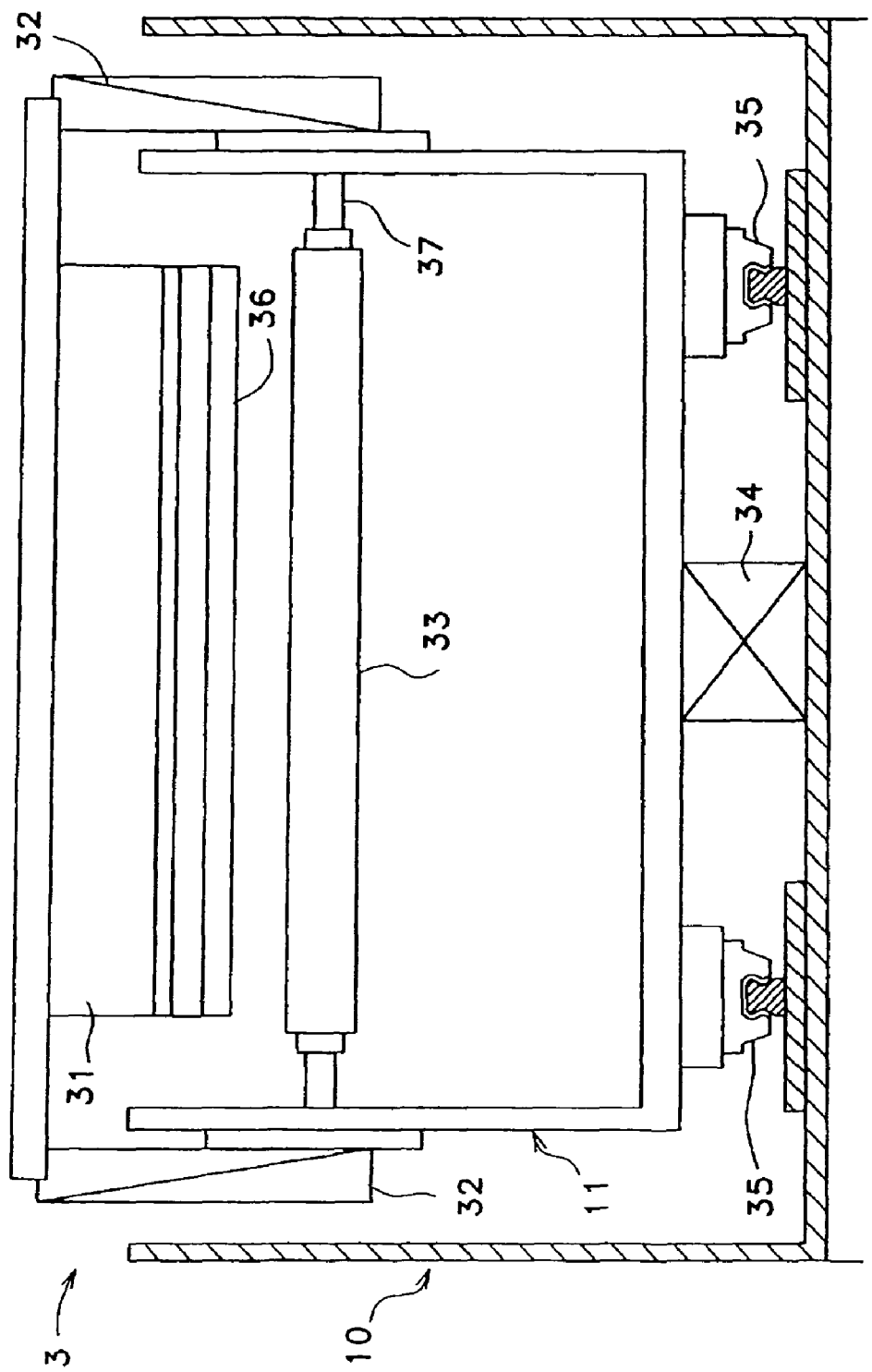
FIG. 5 is a front view of an important part of the envelope making device applied to the enveloping device according to Example 1 of the present invention.

As shown in FIGS. 4 and 5, the envelope making device 3 comprises: a heat cutter 31; cutter actuation means 32; a back-up roller 33; and side follower means 34. Reference number 10 indicates a cross section of a fixed frame that doubles as a housing of the envelope making device 3. Reference number 11 indicates a movable frame slidably attached in the conveying direction via guiding means 35.

The heat cutter 31 is configured to arrange a saw-shaped bar 36 between two retainer plates 30. The saw-shaped bar 36 is heated by a heater built into the bar 36. The cutter actuation means 32 mainly comprises a pair of actuation cylinders respectively provided on both sides of the movable frame 11 and moves the heat cutter 31 up and down with respect to the movable frame 11. The back-up roller 33 is arranged just below the saw-shaped bar 36 of the heat cutter 31 and both sides of shafts 37 are pivotally mounted to both sides of the movable frame 11 respectively. This allows the back-up roller 33 to be supported in a horizontal posture. Such supporting will be referred to as "pivotally supporting" below.

Figure 6:
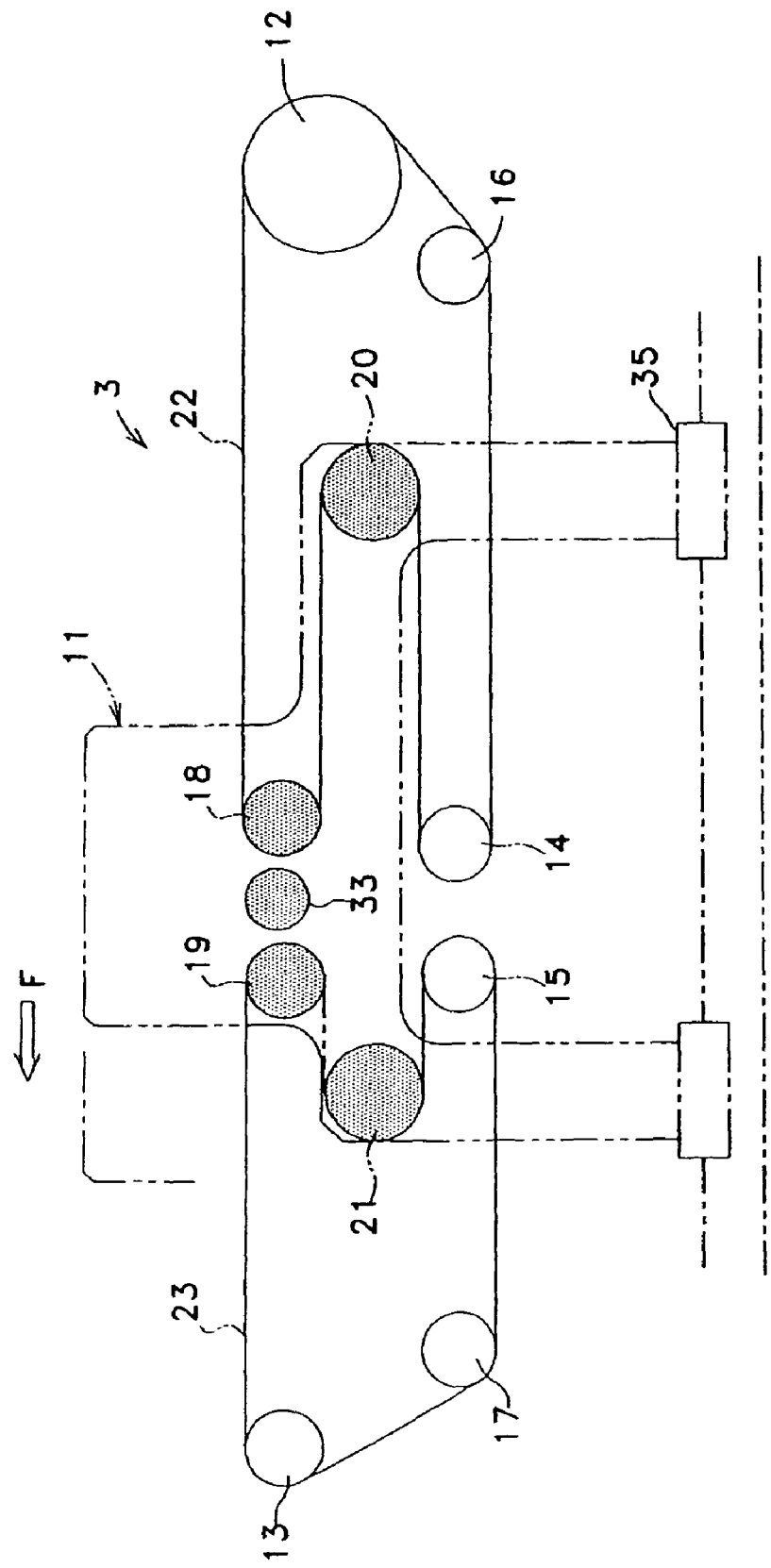
FIG. 6 is a side view illustrating one example of actuation of the envelope making device applied to the enveloping device according to Example 1 of the present invention.
Figure 7:
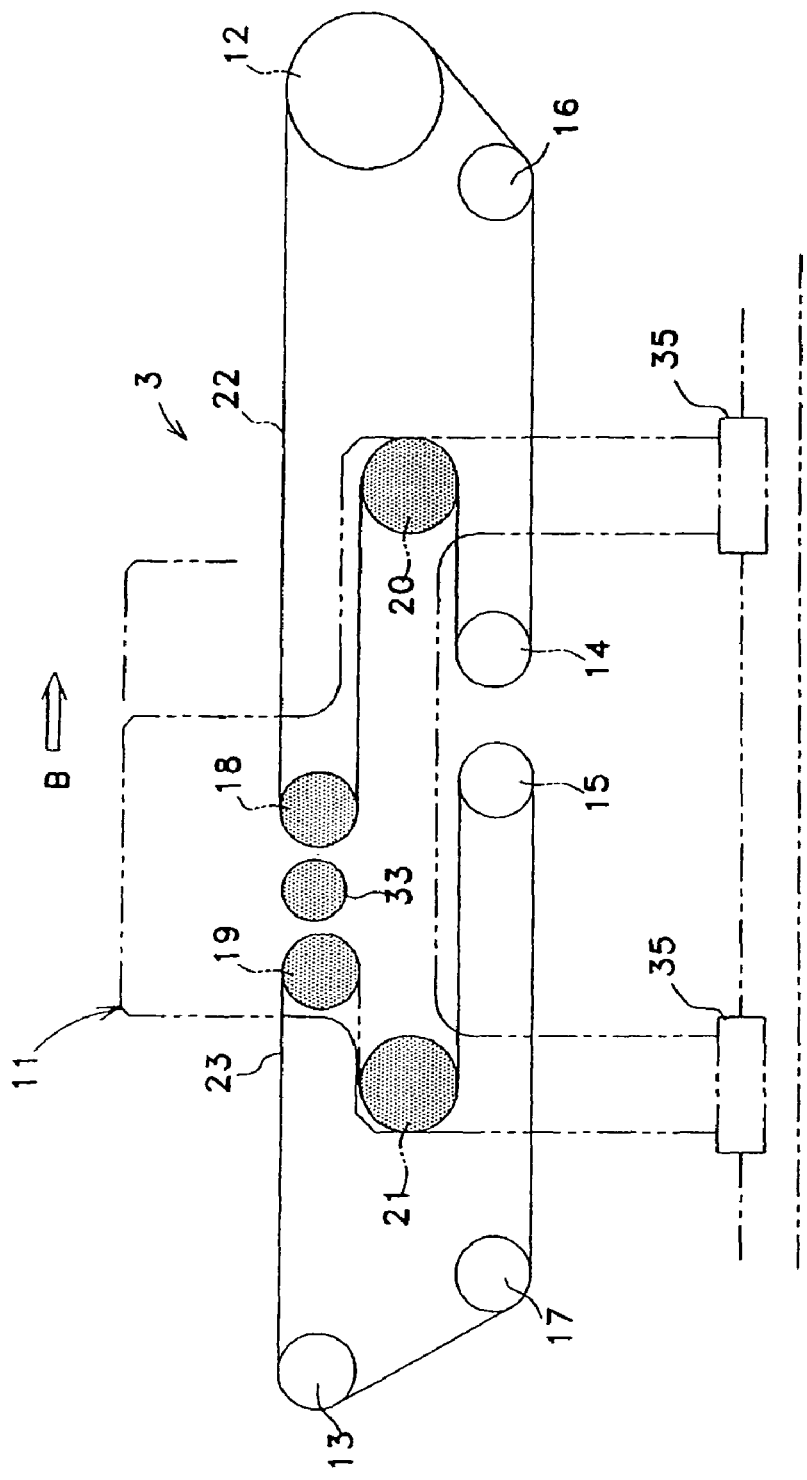
FIG. 7 is a side view illustrating another example of the envelope making device applied to the enveloping device according to Example 1 of the present invention.

The side follower means 34 is feeding means for moving the movable frame 11 to the conveying direction as a slider. The fixed frame 10 pivotally supports a pair of outside wheels 12 and 13 shown in FIGS. 6 and 7, a pair of counter wheels 14, 15, and a pair of guiding wheels 16, 17 respectively. The movable frame 11 supports a pair of inside wheels 18, 19 and a pair of movable wheels 20, 21 as well as the afore-mentioned back-up roller 33 respectively. Elements adding dots in FIGS. 6 and 7 are displaced according to movements of the movable frame 11 made by the side follower means 34 shown in FIG. 5.

The pair of inside wheels 18, 19 are arranged near the back-up roller 33 so as to be spaced apart forward the conveying direction indicated by an arrow F and backward the conveying direction indicated by an arrow B relative to the back-up roller 33. The pair of outside wheels 12, 13 are respectively arranged so as to be spaced apart forward and behind the conveying direction relative to the pair of inside wheels 18, 19. An endless belt 22 for incoming composed of an endless belt is wound around a first outside wheel 12, a first counter wheel 14, a first inside wheel 18 and a first movable wheel 20. The outside wheel 12 is rotated by a driving source. As shown in FIG. 4, the film 7 overlapping in two folds is placed on the endless belt 22 for incoming to pass between the heat cutter 31 and the back-up roller 33 during moving the endless belt 22 for incoming from the outside wheel 12 to the inside wheel 18.

First, operation of an envelope making device 3 will now be described without regard to the displacement of the pair of inside wheels 18, 19 and the pair of movable wheels 20, 21. The cutter actuation means 32 lowers the heat cutter 31 to press the saw-shaped bar 36 of the heat cutter 31 to the film 7 when the film 7 fed from the film feeding means 2 shown in FIG. 2 passes between the heat cutter 31 and the back-up roller 33 shown in FIGS. 4 and 5. In this process, the side follower means 34 moves the movable frame 11, the heat cutter 31, and the back-up roller 33 forward the conveying direction. The speed at which this movable frame 11 is moved is set to be equal to the speed at which the film 7 passes between the heat cutter 31 and the back-up roller 33.

Figure 8:
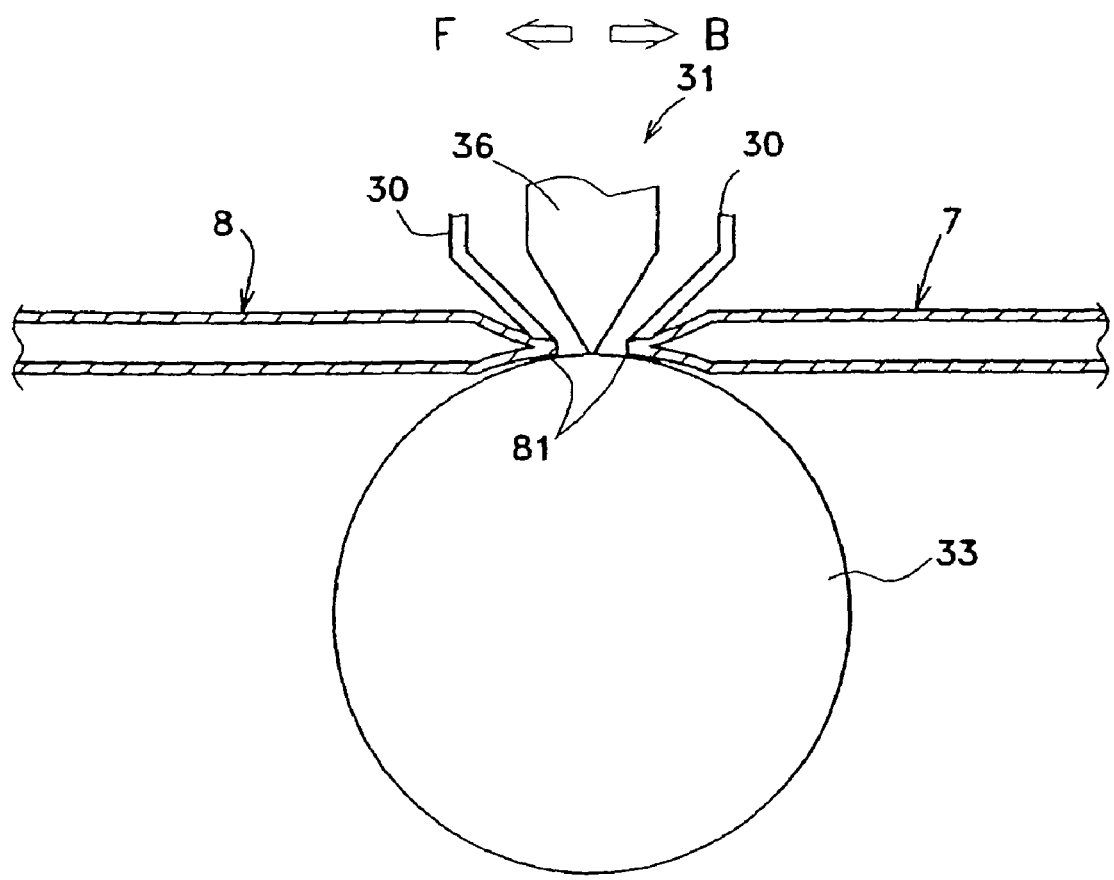
FIG. 8 is a cross-sectional view showing a state of a film divided by the envelope making device applied to the enveloping device according to Example 1 of the present invention.
Figure 9:
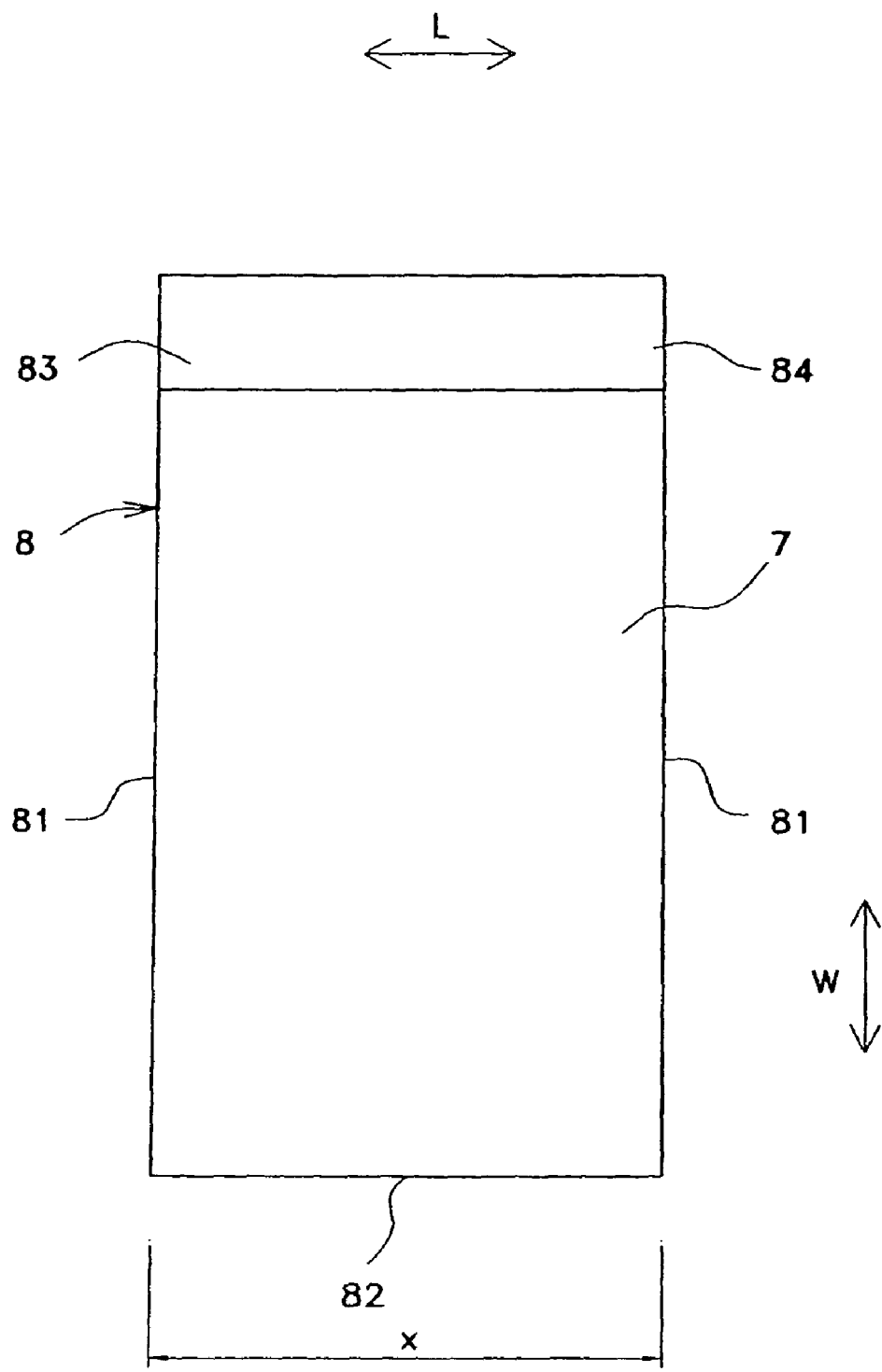
FIG. 9 is a plan view of an envelope made by the envelope making device applied to the enveloping device according to Example 1 of the present invention.

When the saw-shaped bar 36 is pressed to the film 7, as shown in FIG. 8, the film 7 is appropriately pressed from upward by a retainer plate 30. At the same time when the film 7 overlapping in two folds is fused each other by receiving the heat of the saw-shaped bar 36, the film 7 is melt in the middle of the longitudinal direction of the film 7 by the heat of the saw-shaped bar 36 to be divided. This allows the film 7 to be a rectangle envelope 8 having sides 81 in the middle of its longitudinal direction (divided place). As shown in FIG. 9, in the envelope 8, a fold 82 made at the time when the film 7 is folded in two is a rear end and the opposite end is a mouth 83. An overlap width piece 84 extending from the mouth 83 is formed by biasing the position of the fold 82 in the film 7 so that one piece out of the film 7 overlapping in two folds may be longer than the other piece that overlaps it.

Successively, the cutter actuation means 32 lifts the heat cutter 31, which enables the saw-shaped bar 36 of the heat cutter 31 to move away from the film 7. In this process, the side follower means 34 moves the heat cutter 31 and the back-up roller 33 as well as the movable frame 11 backward the conveying direction. Further, the envelopes 8 can be successively produced by repeating the above-mentioned process at the place where the film 7 passes between the heat cutter 31 and the back-up roller 33. In addition, according to the envelope making device 3, the film 7 can be fused and divided while successively feeding the film 7 from the film feeding means 2, so that the quantity of the envelopes 8 produced per hour can increase compared to the case of stopping the film 7 every time the film 7 is fused and divided.

Furthermore, when the saw-shaped bar 36 of the heat cutter 31 is pressed to the film 7, the back-up roller 33 supports the film 7 at the position opposed to the heat cutter 31. This can prevent the film 7 from warping in a wave form or this can also prevent defects, such as wrinkles of the film 7 or the like caused by the high-speed feeding of the film 7 from the film feeding means 2. In addition, it would be preferable to allow the back-up roller 33 to rotate little by little every time the cutter actuation means 32 moves the heat cutter 31 up and down by connecting ratchet mechanism to the back-up roller 33 or the like to prevent the back-up roller 33 from repeatedly receiving a force of the heat cutter 31 pressing to the film 7 at one place.

The width of the envelope 8 indicated by a dimension line x in FIG. 9 is equivalent to the distance that the film 7 moves forward the conveying direction from the point when the cutter actuation means 32 moves the saw-shaped bar 36 of the heat cutter 31 away from the film 7 to the point when the saw-shaped bar 36 is pressed again to the film 7 at a certain position. Accordingly, to widen the width of the envelope 8, it would be preferable to broadly set a range of moving the movable frame 11 in the conveying direction made by the side follower means 34. On the contrary, it is possible to easily change the size of the envelope 8 by setting the range narrower because this makes the width of the envelope 8 narrower.

An endless belt 23 for outgoing composed of an endless belt is wound around a second outside wheel 13, a second counter wheel 15, a second inside wheel 19 and a second movable wheel 21. The outside wheel 13 is rotated by a driving source. In a process that the endless belt 23 for outgoing moves to the outside wheel 13 from the inside wheel 19, the envelope 8 is placed on the endless belt 23 for outgoing to be conveyed toward the fast-forward conveyor 4 shown in FIG. 10.

The fast-forward conveyor 4 faces two belt conveyors 41 each other from an up-and-down direction and pulls the envelopes 8 conveyed from the envelope making device 3 with the envelopes 8 sandwiched between each belts 42 of the respective belt conveyors 41 toward the conveying direction. Driving wheels 43 are rotated by the driving source. The speed of driving the respective belts 42 head of the conveying direction in accordance with the rotation of the driving wheels 43 is set to be faster than the conveying speed at which the envelopes 8 are conveyed from the envelope making device 3. Thus, space between the envelopes 8 reaching the envelope conveying means 5 after passing between the two belt conveyors 41 and the follow-on envelopes 8 is extended to the distance indicated by a dimension line t.

While the wheels 18 to 21 of the side follower means 34 are respectively shown in FIGS. 6 and 7, respective two or more wheels 18 to 20 may be arranged in the direction indicated by an arrow W shown in FIG. 2. Similarly, the endless belts 22 for incoming, the endless belts 23 for outgoing, and the belts 42 not less than two may be arranged. The fast-forward conveyor 4 shown in FIG. 10 may be omitted and the envelopes 8 may be directly conveyed to the envelope conveying means 5 from the endless belt 23 for outgoing. In this case, the speed at which the envelope conveying means 5 conveys the envelopes 8 is set to be faster than the speed at which the envelopes 8 are conveyed from the envelope making device 3.

Next, functions of extension and extraction means served by the pair of inside wheels 18 and 19 and the pair of movable wheels 20 and 21 will now be described in detail. As shown in FIG. 6, in a section to return to the outside wheel 12 from the inside wheel 18, the endless belt 22 for incoming is wound around such wheels in the order of the first movable wheel 20, the first counter wheel 14, and the first guiding wheel 16. Therefore, as shown in FIG. 7, the distance between the movable wheel 20 and the counter wheel 14 is contracted as the movable frame 11 moves forward the conveying direction from the position shown in FIG. 6. The section where the endless belt 22 for incoming moves from the outside wheel 12 to the inside wheel 18 is extended for this extraction.

On the contrary, as shown in FIG. 6, the distance between the movable wheel 20 and the counter wheel 14 is extended as the movable frame 11 moves backward the conveying direction from the position shown in FIG. 7. The section where the endless belt 22 for incoming moves from the outside wheel 12 to the inside wheel 18 is contracted for this extension. Accordingly, even if the inside wheel 18 moves in the conveying direction together with the movable frame 11 as mentioned above, there is little change in tension of the endless belt 22 for incoming.

Furthermore, in the section to return to the inside wheel 19 from the outside wheel 13, the endless belt 23 for outgoing is wound around such wheels in the order of a second guiding wheel 17, the second counter wheel 15, and the second movable wheel 21. Therefore, as shown in FIG. 7, the distance between the counter wheel 15 and the movable wheel 21 is extended as the movable frame 11 moves forward the conveying direction from the position shown in FIG. 6. The section where the endless belt 23 for outgoing moves from the inside wheel 19 to the outside wheel 13 is contracted for this extension.

On the contrary, as shown in FIG. 6, the distance between the counter wheel 15 and the movable wheel 21 is contracted as the movable frame 11 moves backward the conveying direction from the position shown in FIG. 7. The section where the endless belt 22 for incoming moves from the inside wheel 19 to the outside wheel 13 is extended for this contraction. Accordingly, even if the inside wheel 19 moves in the conveying direction together with the movable frame 11 as mentioned above, there is little change in the tension of the endless belt 23 for outgoing.

The film 7 and the envelopes 8 can be respectively conveyed in a stable manner by applying the afore-mentioned extension and contraction means to the envelope making device 3 without any defects, such as loosening of the endless belt 22 for incoming and the endless belt 23 for outgoing or the like when moving the heat cutter 31 and the back-up roller 33 together with the movable frame 11.

Figure 10:
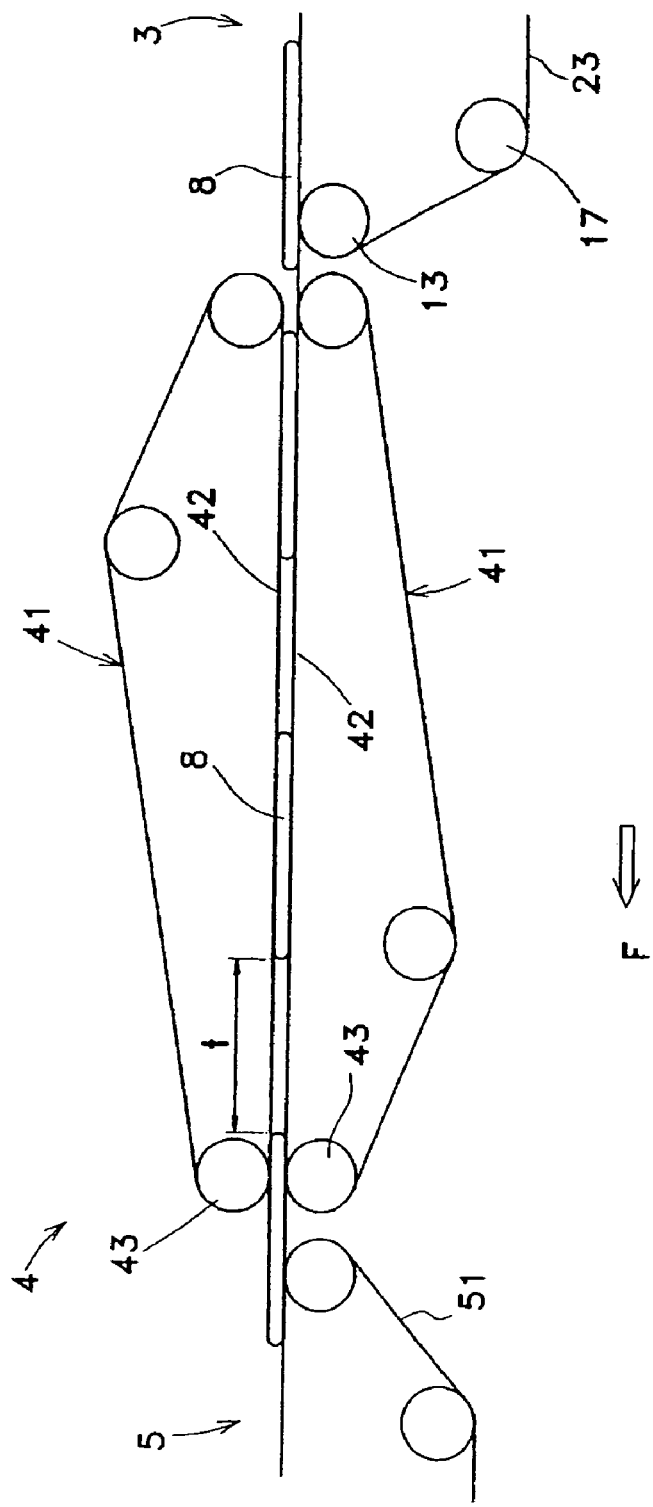
FIG. 10 is a side view showing an example of installing a fast-forward conveyor applied to the enveloping device according to Example 1 of the present invention.
Figure 11:
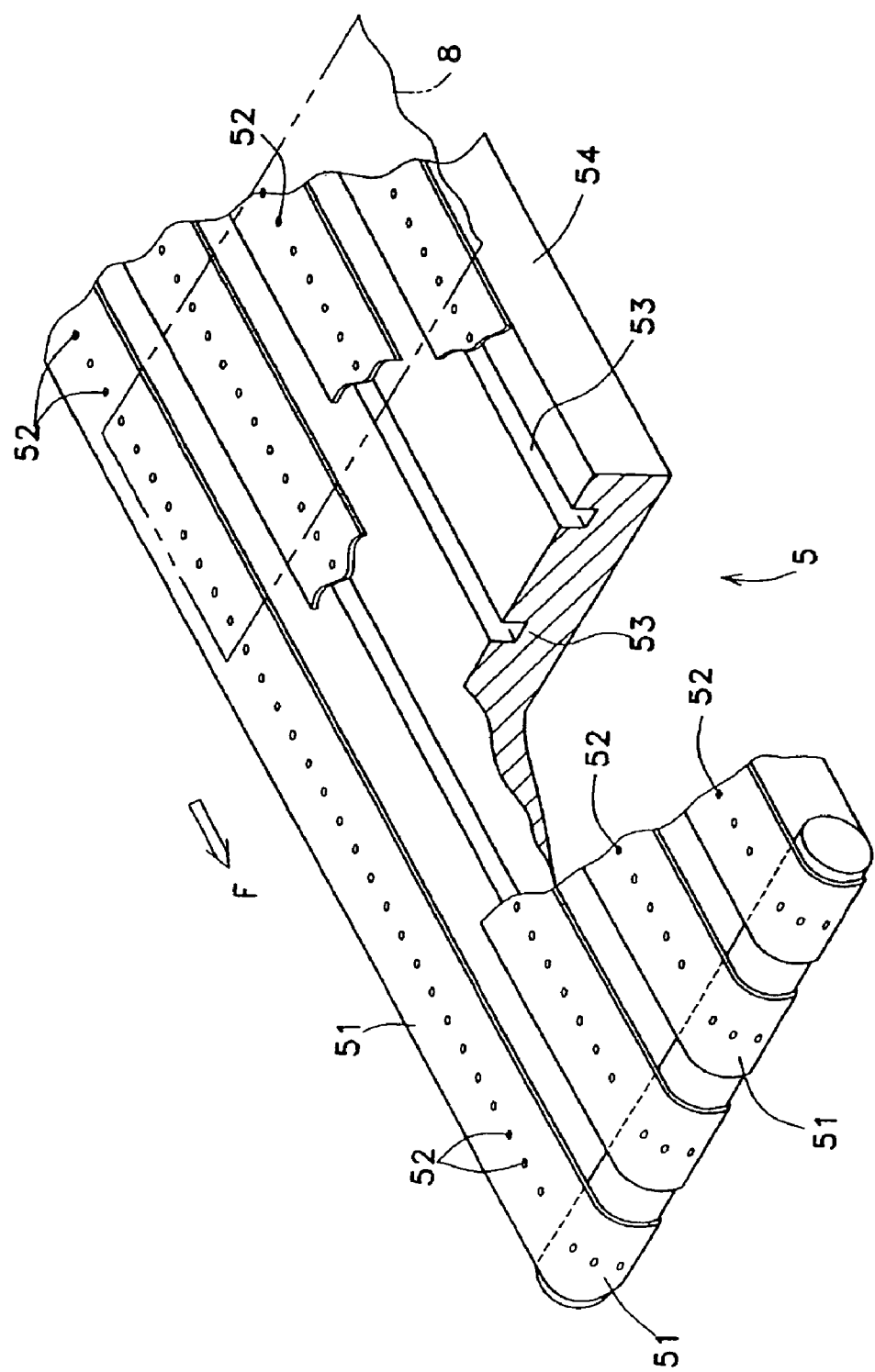
FIG. 11 is a perspective view breaking an important part of envelope conveying means applied to the enveloping device according to Example 1 of the present invention.

As shown in FIGS. 10 and 11, in the envelope conveying means 5, a plurality of air vents 52 are aligned in belts 51 that respectively comprise a belt conveyor and a plate-like support body 54, wherein a plurality of air grooves 53 are respectively formed in a position corresponding to just below the plurality of air vents 52, supports the belts 51. The air grooves 53 are connected to suction means which are not shown in the figures. A typical example of the suction means is an air blower capable of discharging air sucked from its inlet by the rotation of impellers or rotors from its outlet. Air flows toward the air grooves 53 from the upper surface of the belts 51 when air in the air grooves 53 is sucked to the inlet of such air blower. Therefore, the envelopes 8 placed on the belts 51 keep to be adsorbed to the belts 51 in a state of covering the air vents 52.

Figure 12:
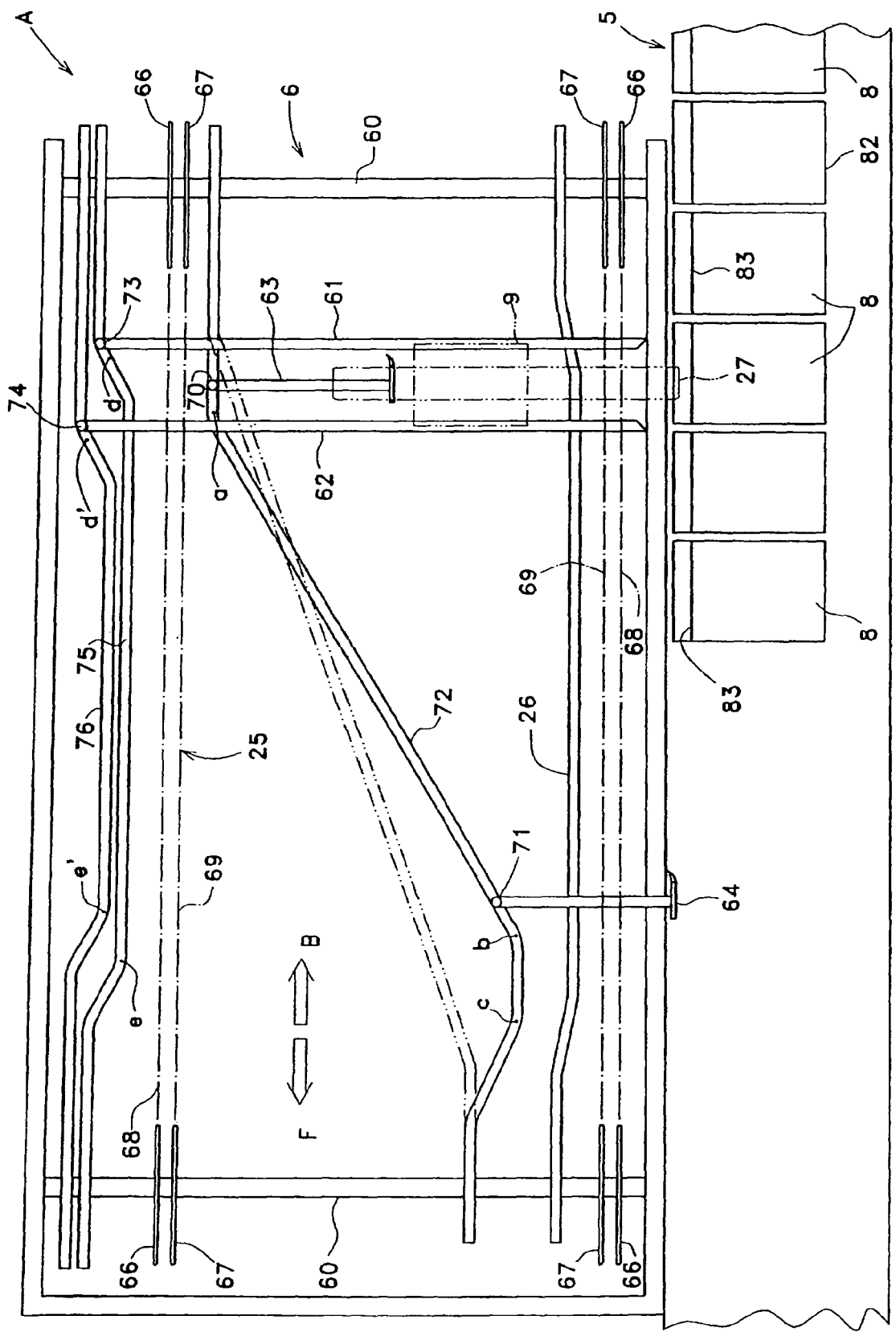
FIG. 12 is a plan view of respective important parts of the envelope conveying means and an inserting device applied to the enveloping device according to Example 1 of the present invention.
Figure 13:
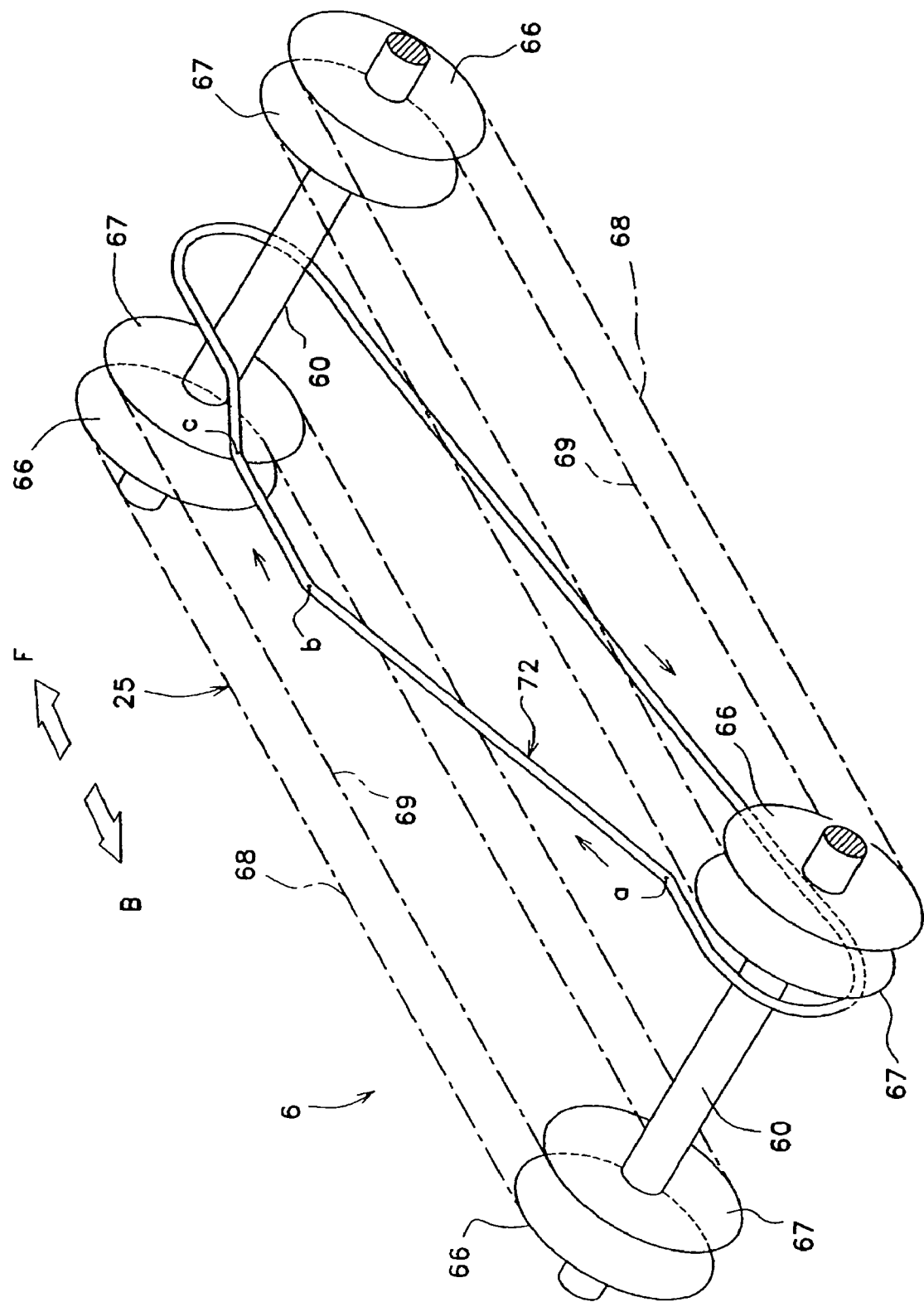
FIG. 13 is a perspective view of an important part of follower means applied to the enveloping device according to Example 1 of the present invention.

As shown in FIG. 12, the inserting device 6 comprises: a pair of guide rails 61, 62 spaced apart each other in the conveying direction for guiding the content 9 into each envelope 8; push rods 63, 64 for pushing the content 9 into each envelope 8; and follower means 25 for moving the guide rails 61, 62 and the push rods 63, 64 in the conveying direction at the above-mentioned conveying speed. FIG. 13 shows an embodiment of the follower means 25 seen from a direction indicated by an arrow A. The follower means 25 comprises: a plurality of follower wheels 66, 67 (2 pieces×4 places) arranged near the envelope conveying means 5; 4 pieces of endless chains 68, 69 respectively wound around the plurality of follower wheels 66, 67; push followers 70, 71 combined to the respective push rods 63, 64; and a push cam rail 72 in an endless state.

Although FIG. 12 shows respective two guide rails 61 and 62 and the push rods 63, 64, actually, tens of guide rails 61, 62 and tens of push rods 63, 64 are alternately arranged. Further, the follower wheels 66, 67 are sprockets having the same diameter. The endless chains 68, 69 are chains driven in accordance with the rotation of the follower wheels 66, 67 to repeat a course to move forward the conveying direction and a course to move backward the conveying direction. The push followers 70, 71 are rollers for rolling across the push cam rail 72 as an orbit to be in contact with the push cam rail 72. The push cam rail 72 is mounted so as to be placed along the direction that the endless chains 68, 69 are driven in accordance with the rotation of the follower wheels 66, 67.

Figure 14:
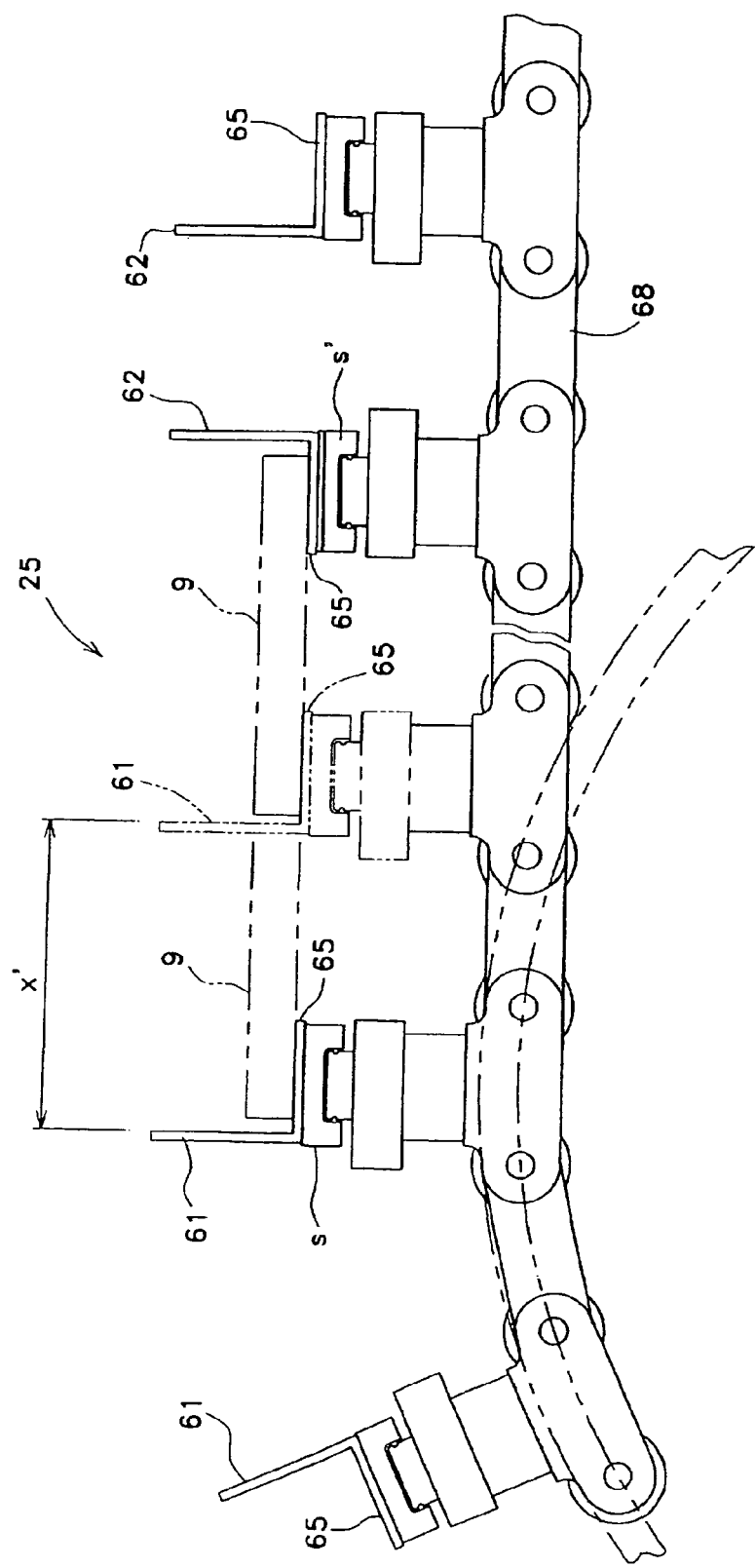
FIG. 14 is a side view of an important part of the inserting device applied to the enveloping device according to Example 1 of the present invention.

As shown in FIG. 14, the cross section of each of the guide rails 61, 62 is substantially L-shaped. The adjacent guide rails 61, 62 are connected to the endless chains 68, 69 in a posture that side pieces 65 are opposed to each other. More specifically, although the guide rails 61 that are first ones of the pairs of guide rails 61, 62 in the figure are connected to the endless chains 68 via guide means s, not connected to the endless chains 69 shown in FIG. 12. Although the second ones of guide rails 62 are connected to the endless chains 69 via the guiding means s', not connected to the endless chains 68. The guiding means s and s' slidably connect the pair of guide rails 61, 62 to the endless chains 68, 69 in each longitudinal direction. Further, the direction in which the pair of guide rails 61, 62 guide the contents 9 corresponds to the above-mentioned longitudinal direction. The push rods 63, 64 are slidably connected to the endless chains 68 via the guiding means not shown in the figure, as well as the first ones of guide rails 61.

Moreover, the space between the guide rails 61, 62 can be adjusted in the scope indicated by the dimension line x' in FIG. 14 so as to support various contents 9 having different dimensions. Referring to FIG. 12, while the follower wheels 66 to which the endless chains 68 are wound are fixed to spindles 60 by keys or the like, the follower wheels 67 to which the endless chains 69 are wound are not directly fixed to the spindles 60, but fastened to the follower wheels 66 by bolts or the like. The follower wheels 67 are allowed to rotate against the follower wheels 66 by fastening the bolts or the like, so that the endless chains 68, 69 are relatively displaced in the conveying direction. This allows the adjustment of space between the first guide rail 61 connected to the endless chain 68 and the second guide rail 62 connected to the endless chain 69.

According to the above-mentioned inserting device 6, in a process that the push follower 70 moves along with the endless chains 68, 69, the push follower 70 and the push rod 63 are displaced in the direction of approaching the envelopes 8. That is, the push rod 63 shown on the left side in FIG. 12 moves to the position of the push rod 64 shown on the left side in the same figure, passing through a point and b point attached to the push cam rail 72 by the push follower 70. In this process, the content 9 fed between the pair of guide rails 61, 62 is pushed into the envelope 8 by the push rod 63.

Thus, while means for feeding the content 9 between the pair of guide rails 61, 62 or its procedure is not limited, for instance, the content 9 previously turned in a horizontal posture may be fed between the pair of guide rails 61, 62 from content feeding means 24 shown in FIG. 2.

Subsequently, the push rod 63 remains stationary with respect to the envelopes 8 because the push rod 63 and the envelopes 8 respectively move in the conveying direction at the same speed in the process that the push follower 70 along with the endless chains 68, 69 moves from b point to c point. Immediately after the push follower 70 passes c point, the push follower 70 and the push rod 63 are displaced in a direction of being away from the envelopes 8 in accordance with the push cam rail 72. And then the push follower 70 and the push rod 63 return to the position shown on the right side in FIG. 12.

Although the afore-mentioned explanation takes note of the push rod 63, the push rod 64 moves at the same time when the push rod 63 moves, so that the push rods 63, 64 respectively make the same motion. The same thing happens to all of the motions of the push rods not shown in the figure. All of the push rods including the push rods 63, 64 continue the above-mentioned motions, so that the contents 9 can be sequentially inserted into the plurality of envelopes 8.

Furthermore, the guide followers 73, 74 are also respectively joined to the pair of guide rails 61, 62. The reference numbers 75, 76 shown in FIG. 12 indicate guide cam rails for slidably engaging the guide followers 73, 74. Although these guide cam rails 75, 76 show the respective upper parts (orbits that the guide followers 73, 74 move) in the figure, these guide cam rails are endless as well as the push cam rails 72 shown in FIG. 13 and are arranged along in the direction that the endless chains 68, 69 are driven.

The guide followers 73, 74 are displaced in the direction of approaching the envelopes 8 in accordance with the guide cam rails 75, 76 immediately after passing d and d' points attached to the guide cam rails 75, 76 in the process of moving along with the endless chains 68, 69. This enables the pair of guide rails 61, 62 to move forward from the position indicated by continuous lines to the position indicated by virtual lines in FIG. 15. The timing when the pair of guide rails 61, 62 move forward is set virtually the same as the timing when the push rods 63, 64 push the content 9 into the envelope 8. In such a way, the content 9 pushed by the push rods 63, 64 can be reliably guided to the mouth 83 of the envelope 8 by approaching the pair of guide rails 61, 62 to the envelope 8.

Subsequently, the pair of guide rails 61, 62 remain static in a process that the guide followers 73, 74 move to e point and e' point along with the endless chains 68, 69. Immediately after the guide followers 73, 74 pass the e point and e' point, however, the guide followers 73, 74 and the pair of guide rails 61, 62 are displaced in the direction of moving away from the envelopes 8 respectively following the guide cam rails 75, 76. This enables the pair of guide rails 61, 62 to fall back from the position indicated by the virtual lines to the position indicated by the continuous lines in FIG. 15. And then the guide followers 73, 74 and the pair of guide rails 61, 62 return to the position indicated on the right side in FIG. 12.

It is to be understood that this invention may be embodied in a form variously improved, corrected or modified based on the knowledge of those skilled in the art without departing from the spirit and the scope of the invention and may be practiced in the embodiments below.

That is, although it has been described that the film 7 is divided when the saw-shaped bar 36 shown in FIG. 8 is pressed to the film 7, for example, discontinuous slits called perforations may be formed in the film 7 by making the edge of the saw-shaped bar 36 in a saw like unevenness and cutting the portion of the projection into the film 7. In this case, the adjacent envelopes 8 are not completely divided, so that the belts 42 of the fast-forward conveyor 4 are synchronized with the conveying speed or the fast-forward conveyor 4 may be omitted. Further, the respectively adjacent envelopes 8 can be completely separated by shearing the film 7 with the perforations. This process may be performed after the insertion of the content 9 into each envelope 8.

Figure 15:
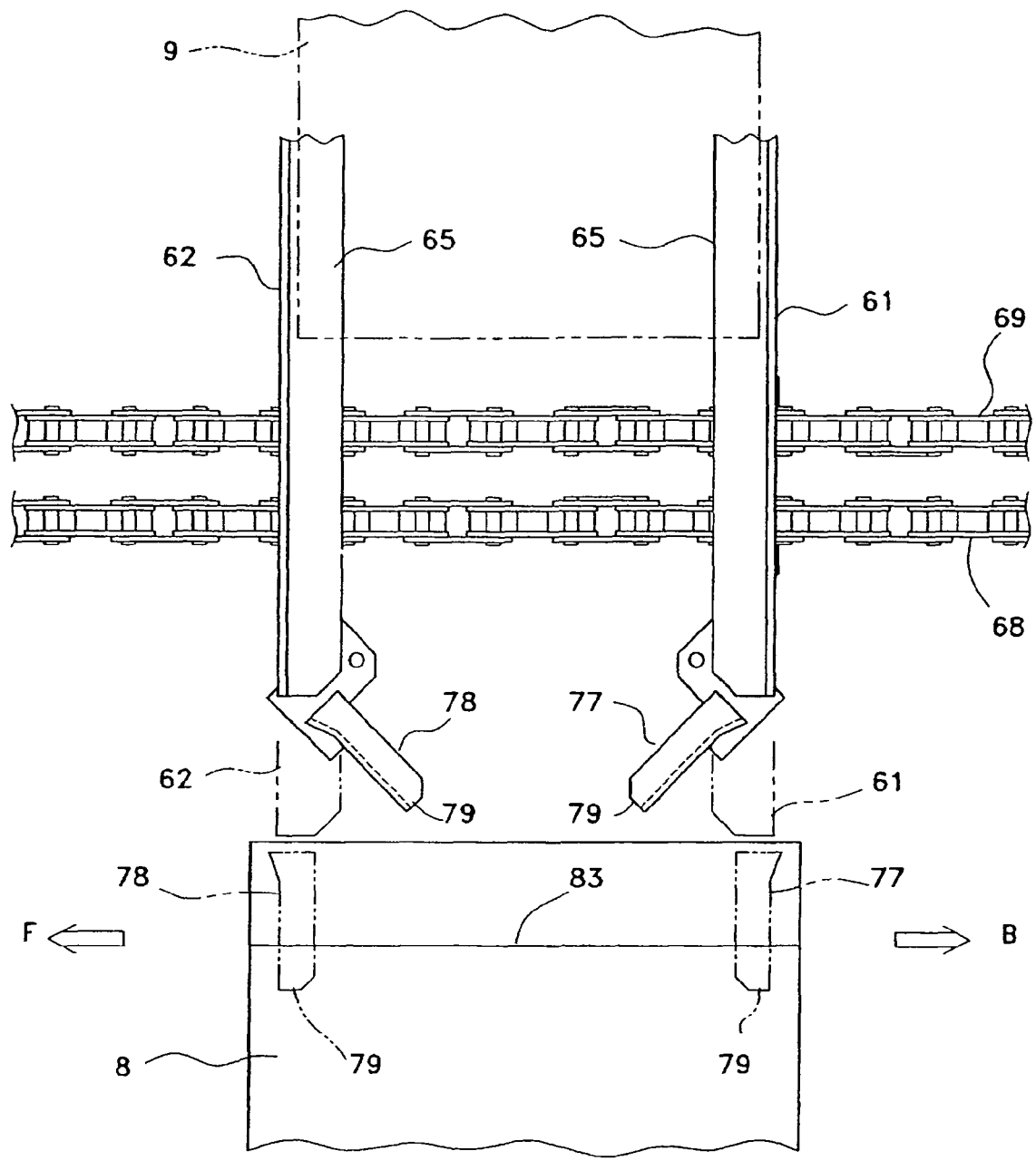
FIG. 15 is a plan view showing a variation of the important part of the inserting device applied to the enveloping device according to Example 1 of the present invention.

Alternatively, as shown in FIG. 15, a pair of swinging guide pieces 77, 78 may be rotatably attached to the pair of guide rails 61, 62 via hinges. In this case, respective tips of the pair of swinging guide pieces 77, 78 project toward the inside of the envelope 8 when the pair of guide rails 61, approach the envelop 8. And the respective tips 79 of the pair of swinging guide pieces 77, 78 are pulled away from the envelope 8 when the pair of guide rails 61, 62 are away from the envelope 8.

The pair of swinging guide pieces 77,78 respectively have a substantially groove-shaped cross section so as to respectively support both side-edges of the content 9, so that this prevents the content 9 pushed out forward the pair of guide rails 61, 62 from deviating from the mouth 83 of the envelope 8 and functions to expand the mouth 83. Further, while means for actuating the pair of swinging guide pieces 77, is not limited at all, a cam mechanism for actuating the pair of swinging guide pieces 77, 78 as mentioned above may be applied following the cam rails 26 as shown in FIG. 12. A tongue-shaped plate 27 is added to support the content 9 between the pair of guide rails 61, 62 and then the tongue-shaped plate 27 enters inside the envelope 8. The tongue-shaped plate 27 may be moved away from the envelope 8 when the pair of guide rails 61, 62 are pulled away from the envelope 8.

Example 2

Other embodiments of the cutter actuation means will now be described in detail. Same names or same reference numbers are used for elements which have already been described in Example 1 and the description and the indication in the figures will be omitted.

Figure 16:
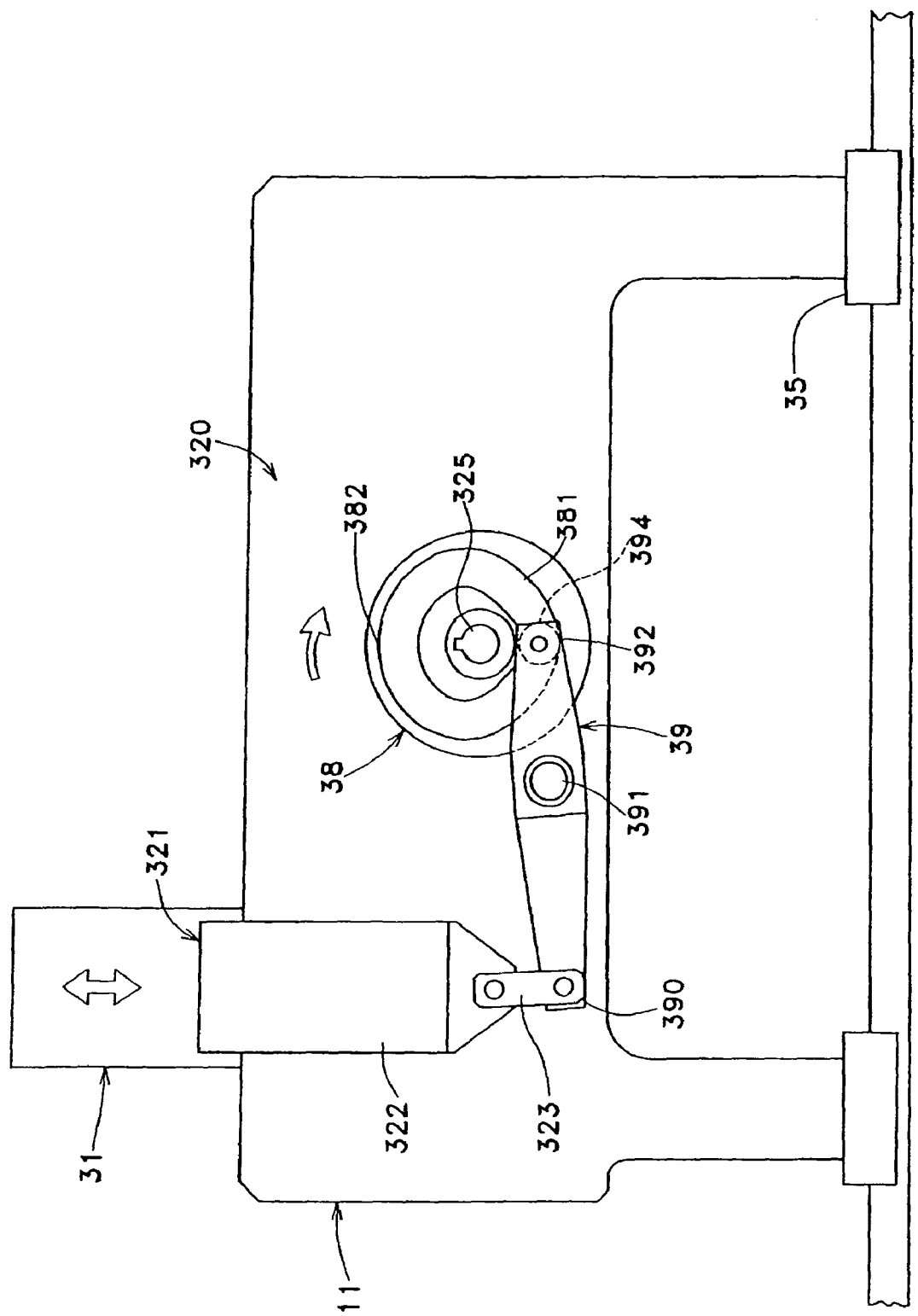
FIG. 16 is a side view of an important part of cutter actuation means applied to the enveloping device according to Example 2 of the present invention.
Figure 17:
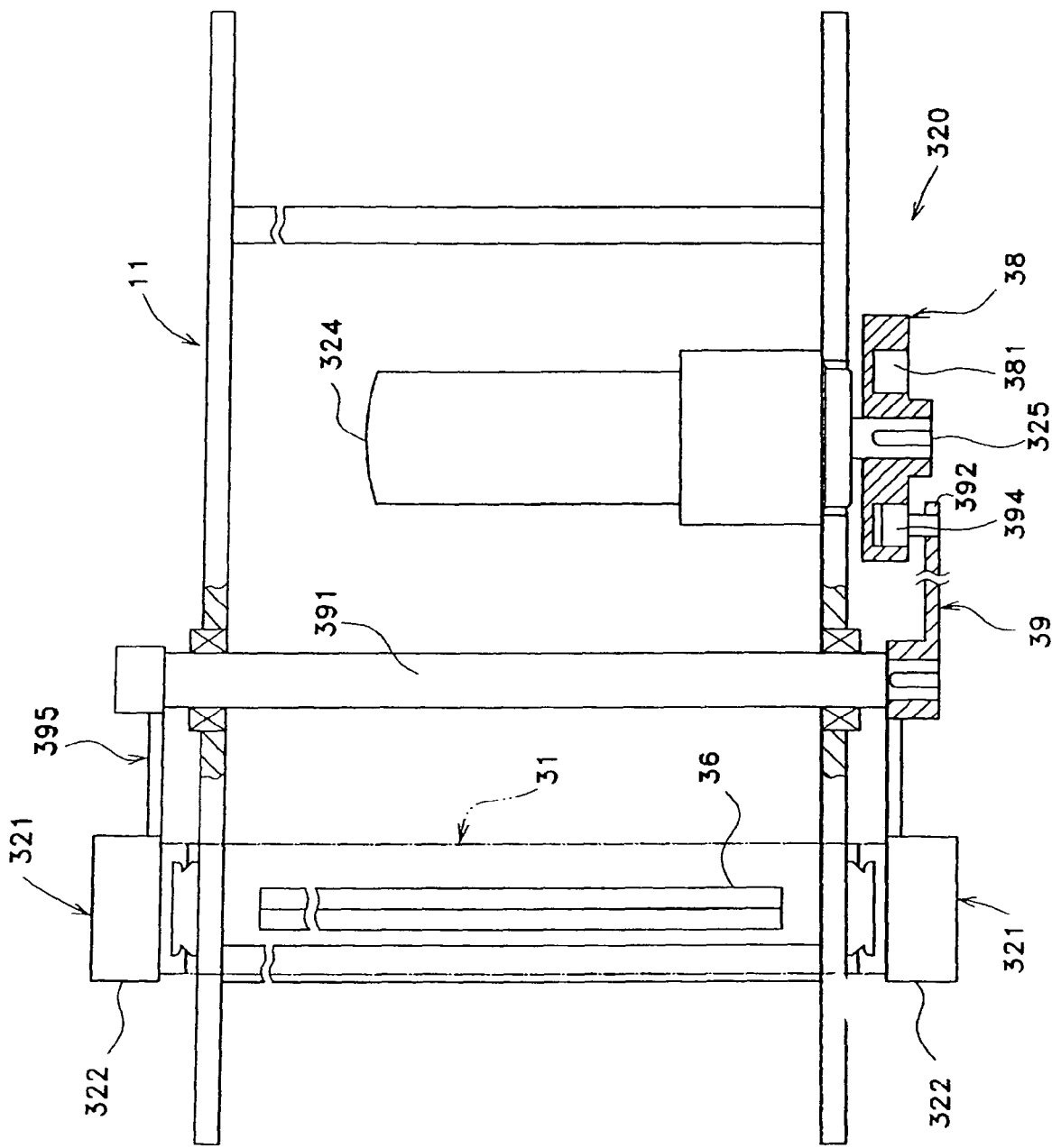
FIG. 17 is a plan view breaking the important part of the cutter actuation means applied to the enveloping device according to Example 2 of the present invention.

As shown in FIGS. 16 and 17, the cutter actuation means 320 comprises: a pair of guiding means 321 for liftably and lowerably guiding the heat cutter 31 with respect to the movable frame 11; a cam 38 rotatably provided on one side of the movable frame 11; a follower rod 39 for moving forward and backward in an upper and lower direction in accordance with the cam 38; and a connecting rod 323 for connecting a tip 390 of the follower rod 39 to a slider 322 of a first guiding means out of the pair of guiding means 321.

The pair of guiding means 321 respectively connect respective sliders 322 to both sides of the heat cutter 31 to liftably and lowerably guide the heat cutter 31 with respect to the movable frame 11. In the cam 38, a curved groove 381 circling around an output spindle 325 is formed on the outer surface of a round plate connected to the output spindle 325 of a driving source 324 composed of a rotating machine with reducer. The follower rod 39 is attached to one end of a rotation spindle 391 pivotally supported by the movable frame 11. As shown in FIG. 16, an edge 392 of the follower rod 39 extends from one end of the rotation spindle 391 to downward the output spindle 325 and is equipped with a roller 394 to go under the curved groove 381. FIG. 17 shows the follower rod 39 in a reduced form than the actual one to show the state in which the roller 394 goes under the curved groove 381.

Moreover, as shown in FIG. 17, an arm 395 is attached to the other end of the rotation spindle 391. The length of the arm 395 corresponds to the distance from the tip 390 of the follower rod 39 to one end of the rotation spindle 391 shown in FIG. 16. Although one connecting rod 323 is shown in the figure, the arm 395 is connected to the slider 322 of the other guiding means out of the pair of guiding means 321 via a similar connecting rod.

According to the cutter actuation means 320, the tip 390 of the follower rod 39 reciprocates in a vertical direction using the rotation spindle 391 as a support because the roller 394 and the edge 392 of the follower rod 39 are displaced in the vertical direction in accordance with the curved groove 381 of the cam 38 every time the driving source 324 rotates the cam 38 once. The heat cutter 31 and the respective sliders 322 of the pair of guiding means 321 go up and down by the transmission of this actuation of the follower rod 39 to the respective sliders 322 of the pair of guiding means 321 via the connecting rod 323, the rotation spindle 391, and the arm 395.

For instance, when the cam 38 is rotated in a clockwise direction from the position indicated in FIG. 16, thus, the heat cutter 31 goes up and reaches the upper limit when the cam 38 and an arc part 382 of the curved groove 381 rotate to the position of the roller 394. The heat cutter 31 is kept at the upper limit while the roller 394 is guided in the arc part 382. Furthermore, as the cam 38 rotates in the clockwise direction, the heat cutter 31 goes down and then reaches the lower limit at the time when the cam 38 returns to the position indicated in the figure. At this point, the saw-shaped bar 38 shown in FIG. 8 is pressed to the film 7.

In this embodiment, the following advantages can be obtained because the cam mechanism for guiding the roller 394 of the follower rod 39 with the curved groove 381 in the cam 38 is applied as cutter actuation means 320. That is, when the saw-shaped bar 36 is pressed to the film 7, reaction force to jump out of the back-up roller 33 is generated in the heat cutter 31 by a light hit of the saw-shaped bar 36 against the back-up roller 33. Although using the rotation spindle 391 as a support, rotation force is generated in the follower rod 39 for receiving this reaction force via the sliders 322 and the connecting rod 323, the roller 394 that goes under the curved groove 381 limits the rotation of the follower rod 39. Accordingly, it is possible to secure necessary time for the place where the film 7 overlaps in two folds to be fused by the heat of the saw-shaped bar 36 in a state that the saw-shaped bar 36 is pressed to the film 7 without jumping out of the heat cutter 31.

In addition, the follower rod 39 is connected to the arm 395 via the rotation spindle 391 and both sides of the heat cutter 31 are mechanically joined to each other. Therefore, according to the cutter actuation means 320, the heat cutter 31 can move up and down while perfectly synchronizing both sides of the heat cutter 31. In other words, the whole area of the width direction of the film 7 can be uniformly divided by the saw-shaped bar 36 because the heat cutter 31 can move up and down while keeping in a horizontal posture where the height of one of the sides is the same as that of the other of the sides. This results in improvement in quality level of the cut end of the divided film 7.

Example 3

Figure 18:
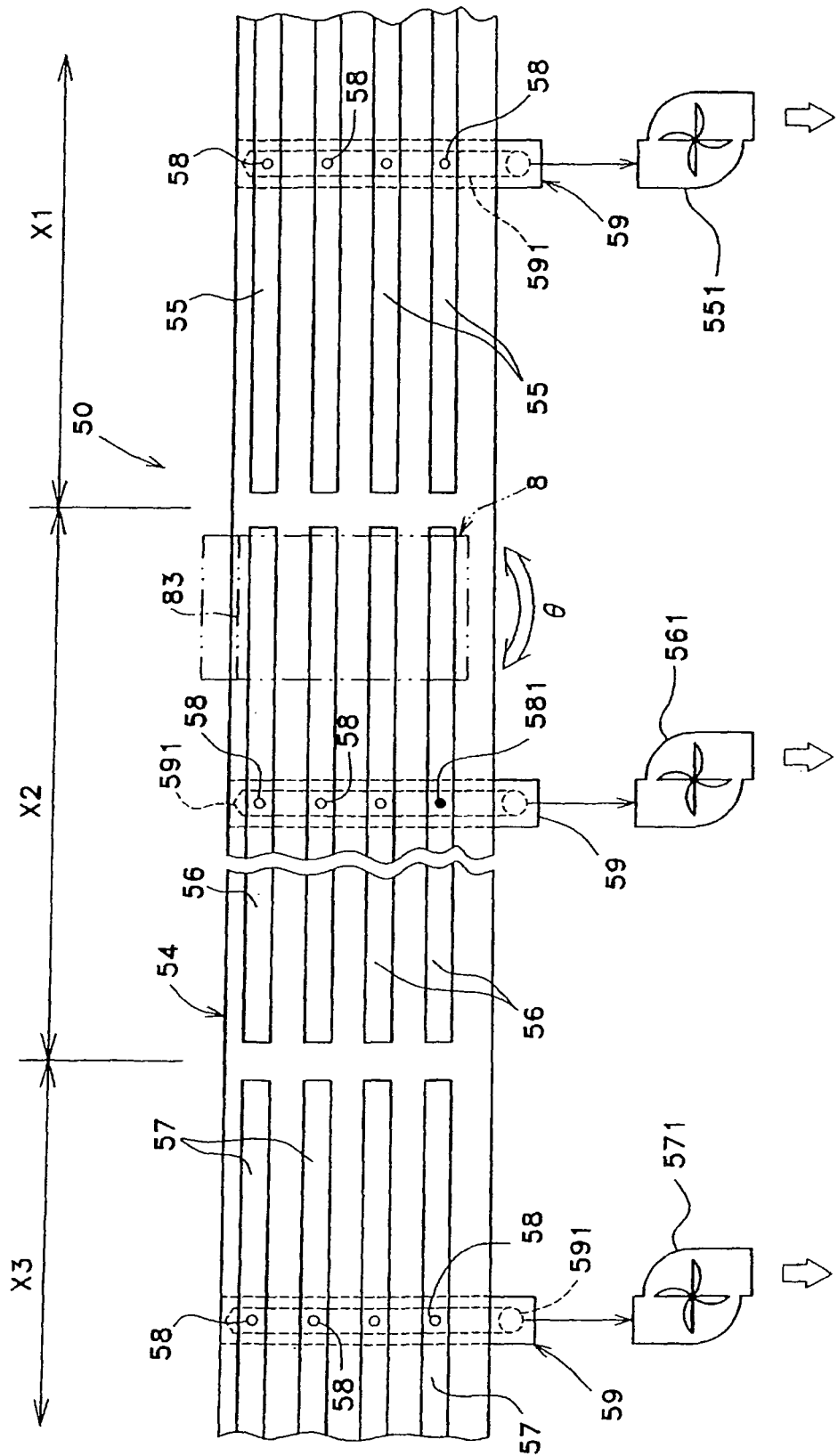
FIG. 18 is a plan view of the important part of the envelope conveying means applied to the enveloping device according to Example 3 of the present invention.
Figure 19:
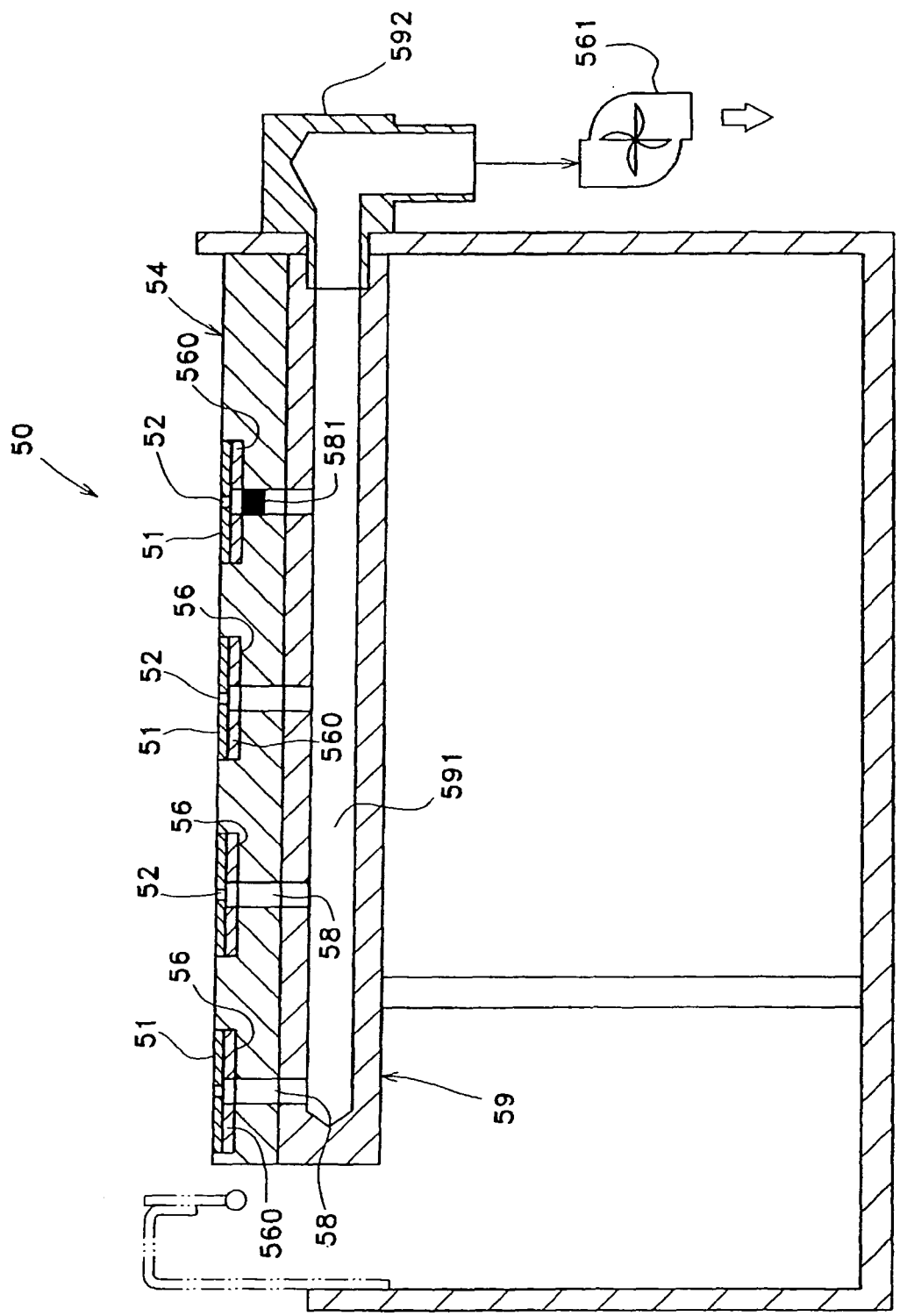
FIG. 19 is a cross-sectional view of the envelope conveying means applied to the enveloping device according to Example 3 of the present invention.

Other embodiments of the envelope conveying means will now be described in detail. As shown in FIGS. 18 and 19, envelope conveying means 50 supports four belts 51 respectively having an air vent 52 with the support body 54. Four lines of air grooves 55 to 57 extending in the conveying direction are formed in the positions corresponding to the air vents 52 of the four belts 51 in the support body 54.

The air grooves 55 to 57 are formed in sections X1 to X3 respectively indicated by dimension lines in FIG. 2. The air grooves 55 to 57 are arranged longitudinally one another in the conveying direction and as shown in FIG. 18, the respective ends of the air grooves 55 to 57 are divided. Bottom holes 58 opened inside the air grooves 56 are penetrated to air ducts 591 inside ventilation members 59 attached to the lower surface of the support body 54. The reference number 560 shown in FIG. 19 indicates synthetic resin belts mounted on the inner side of the air grooves 55 to 57 to reduce friction between the four belts 51 and the support body 54.

The ventilation member 59 wherein a hose union 592 is provided on one end of the air duct 591 extending in the direction of crossing 4 rows of air grooves 56 is connected to a suction inlet of the air blower 561 via a hose connected to the hose union 592 or the like. When the air blower 561 sucks air from its suction inlet, suction is generated in the air vents 52 of the four belts 51 in the section X2. Similarly, an air blower 551 and an air blower 571 are respectively connected to the air grooves 55 and 57. When the air blowers 551 and 571 suck air, suction is generated in the air vents 52 of the four belts 51 in the sections X1 and X3.

Since it is possible to respectively control output of three units of the air blowers 551, 561, and 571, suction generated in the air vents 52 on the belt 51 in the section X2 may be preferably weakened relatively. The reason for this is as mentioned below.

That is, it is not always true that the inserting device 6 shown in FIGS. 2 and 12 is in a posture straight along the direction in which the envelopes 8 allow the sides 81 to follow the direction in which the pair of guide rails 61, 62 or the push rod 63 work in the process of pushing the content 9 fed between the pair of guide rails 61, 62 into each envelope 8. For instance, the posture of the envelopes 8 might slightly tilt when or immediately after the envelopes 8 pass between the two belt conveyors 41 shown in FIG. 10. In this situation, such defects occur that the envelopes 8 may be broken by strong abrasion of the contents 9 when the inserting device 6 actuates the push rod 63 to push the contents 9 into the envelopes 8.

Accordingly, the output of the air blower 561 is set so low that the envelope conveyed to the section X2 by the envelope conveying means 50 can slide over the four belts 51. In this situation, the contents 9 or the pair of guide rails 61, 62 touch the inside of the sloped envelopes 8 as mentioned above when the inserting device 6 pushes the contents 9 into the envelopes 8, which enables the posture of the envelopes 8 to be corrected. Therefore, there is no possibility of the envelopes 8 being broken because it is possible to previously prevent strong abrasion between the envelopes 8 and the contents 9.

Further, when the posture of the envelopes 8 sloped as above is corrected, the envelopes 8 tend to rotate in the direction indicated by an arrow θ near the center of the mouths 83. Taking note of this point, it becomes further easier to rotate the envelopes 8 by closing the bottom holes 58 in the air grooves 56 that are most distant from the mouths 83 of the envelopes 8 with plugs 581 to remove suction of the air vents 52 of one of the belts 51. Alternatively, leaving the air grooves 56 that are most close to the mouths 83 of the envelope 8, the bottom holes 58 of other three air grooves 56 may be closed. Furthermore, on-off valves may be attached to the bottom holes 58 in place of the plugs 581, so that it is possible to obtain similar effects as the plugs 581 by closing the on-off valves.

INDUSTRIAL APPLICABILITY

In the present invention, contents can be inserted into envelopes at high speed and successively without man power, so that the present invention is a useful technique to produce a large amount of envelopes at one time and insert the contents into all envelopes as in the case of delivering catalogs of merchandise by direct mail.

There has thus been shown and described a novel enveloping device which fulfills all the objects and advantages sought therefor. Many changes, modifications, variations and other uses and applications of the subject invention will, however, became apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An enveloping device comprising:
   film feeding means for feeding a film in folded form in a longitudinal, feeding direction, said film having two overlapping webs extending in a transverse, width direction from a fold on one edge;
   an envelope making device for forming an envelope by cutting and fusing the folded film by pressing a heat cutter, that extends in the width direction of the film, against the film to divide and fuse the film in the middle of the longitudinal, feeding direction;
   envelope conveying means for conveying the envelope in the longitudinal, feeding direction; and
   an inserting device, disposed adjacent the conveying means, for inserting content into the envelope,
   wherein the envelope making device presses the heat cutter against the film while moving the heat cutter forward in the longitudinal, feeding direction while the envelope is being conveyed by the conveying means;
   wherein the inserting device inserts the content into the envelope while moving the content forward in the longitudinal, feeding direction while the envelope is being conveyed by the conveying means; and
   wherein the envelope conveying means comprises:
   a belt conveyor including a plurality of belts arranged to move parallel to each other in the longitudinal direction, each belt having formed therein a plurality of air vents extending along the longitudinal direction;
   a support body, disposed beneath and supporting the plurality of belts, said support body having formed therein a plurality of air grooves extending parallel to each other in the longitudinal direction below the plurality of air vents in the belts;
   suction means for generating suction in an air duct for applying suction to the plurality of air grooves and thereby to the plurality of air vents; and
   opening/closing means connecting the air duct with selected ones of said plurality of air grooves, for permitting and, alternatively, blocking the air duct from applying suction to said selected air grooves.

2. The device according to claim 1, wherein the envelope making device further comprises: cutter actuation means for pressing the heat cutter against the film and moving the heat cutter away from the film; a back-up roller opposed to the heat cutter for supporting a part of the film where the heat cutter is pressed to; and side follower means for moving the heat cutter and the back-up roller forward in the feeding direction in the process of pressing the heat cutter to against the film and moving the heat cutter and the back-up roller in a direction opposite to the feeding direction in the process of moving the heat cutter away from the film.

3. The device according to claim 2, wherein the cutter actuation means comprises: guiding means for guiding the heat cutter; a cam rotated by a driving source; and a follower rod for reciprocating in accordance with the cam,
   wherein the follower rod is connected to the heat cutter.

4. The device according to claim 1, wherein the inserting device comprises: a pair of guide rails spaced apart from each other in the feeding direction for guiding the content into the envelope; a push rod arranged between the pair of guide rails for pushing the content into the envelope; and follower means for moving the pair of guide rails and the push rod in the feeding direction at a conveying speed that the envelope conveying means conveys the envelope.

5. The device according to claim 4, wherein the follower means comprises: a plurality of follower wheels spaced apart from each other in the feeding direction; an endless chain wound around the plurality of follower wheels and driven at the conveying speed in accordance with the rotation of the plurality of follower wheels; a push follower connected to the push rod; and an endless push cam rail mounted along the endless chain for slidably engaging the push follower,
   wherein the push follower and the push rod are displaced in a direction toward an approaching envelope in accordance with the push cam rail in a process whereby the pair of guide rails and the push rod are supported by the endless chain and then, alternatively, the endless chain is driven such that the push follower and the push rod are displaced in a direction away from the envelope.

6. The device according to claim 5, wherein the follower means further comprises: a guide follower connected to the pair of guide rails; and an endless guide cam rail mounted along the endless chain for slidably engaging the guide follower,
   wherein the guide follower and the pair of guide rails are displaced in the direction toward an approaching envelope in accordance with the guide cam rail in a process whereby the endless chain is driven and then, alternatively, the guide follower and the guide rails are displaced in the direction of moving away from the envelope.

* * * * *